United States Patent [19]
Liao et al.

[11] Patent Number: 5,857,684
[45] Date of Patent: *Jan. 12, 1999

[54] COLLAPSIBLE GOLF CART

[76] Inventors: Gordon Liao; Alex Cheng, both of 36 Lane 320 Sec. 2 Cheng Kong Road, Taipei, Taiwan

[ * ] Notice: This patent issued on a continued prosecution application filed under 37 CFR 1.53(d), and is subject to the twenty year patent term provisions of 35 U.S.C. 154(a)(2).

[ * ] Notice: The terminal 13 months of this patent has been disclaimed.

[21] Appl. No.: 71,803

[22] Filed: Jun. 1, 1993

[51] Int. Cl.$^6$ ...................................................... B62B 1/02
[52] U.S. Cl. ............................... 280/40; 280/42; 280/652; 280/655; 280/DIG. 6; 280/645
[58] Field of Search ................................. 280/38, 40, 645, 280/42, 651, 652, 655, DIG. 6, DIG. 5

[56] References Cited

U.S. PATENT DOCUMENTS

| | | | |
|---|---|---|---|
| 3,489,426 | 1/1970 | Bond | 280/DIG. 6 |
| 4,946,186 | 8/1990 | Cheng | 280/655 |
| 5,180,184 | 1/1993 | Chiu | 280/DIG. 6 |
| 5,201,540 | 4/1993 | Wu | 280/DIG. 6 |
| 5,281,044 | 1/1994 | Chen | 280/DIG. 6 |

FOREIGN PATENT DOCUMENTS 2575430   7/1986   France .

*Primary Examiner*—Richard M. Camby

[57] ABSTRACT

A first frame member and a second frame member are pivotally joined at respective ends thereof for movement towards each other into a collapsed disposition and for movement away from each other into an erected condition wherein the members are at right angles to each other. One of the members supports to each of its sides an articulating wheel support and wheel and carries within its hollow a slide which is connected by pivots to each of said wheel supports and by pivoting straps to the other frame member so that when the frame members pivot apart the wheels move out and so that when the frame members pivot towards each other the wheels are drawn in so that the entire device assumes a collapsed condition. The frame members carry supports for a golf bag and may carry a battery tank (for a battery when the wheels are driven by motors that are battery powered) storage containers, seats, an umbrella stand and similar articles useful to a golfer. A number of wheel support configurations are provided.

98 Claims, 19 Drawing Sheets

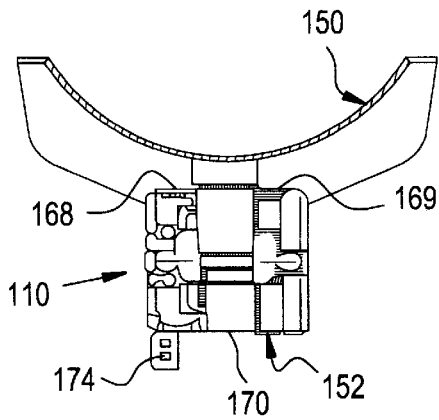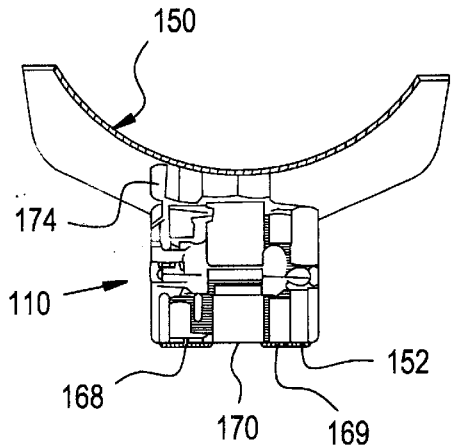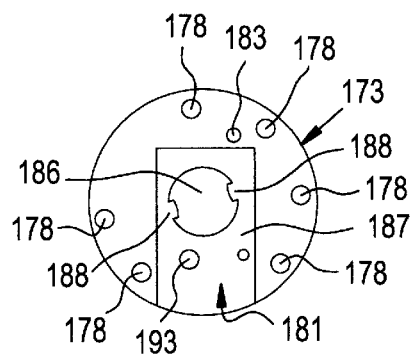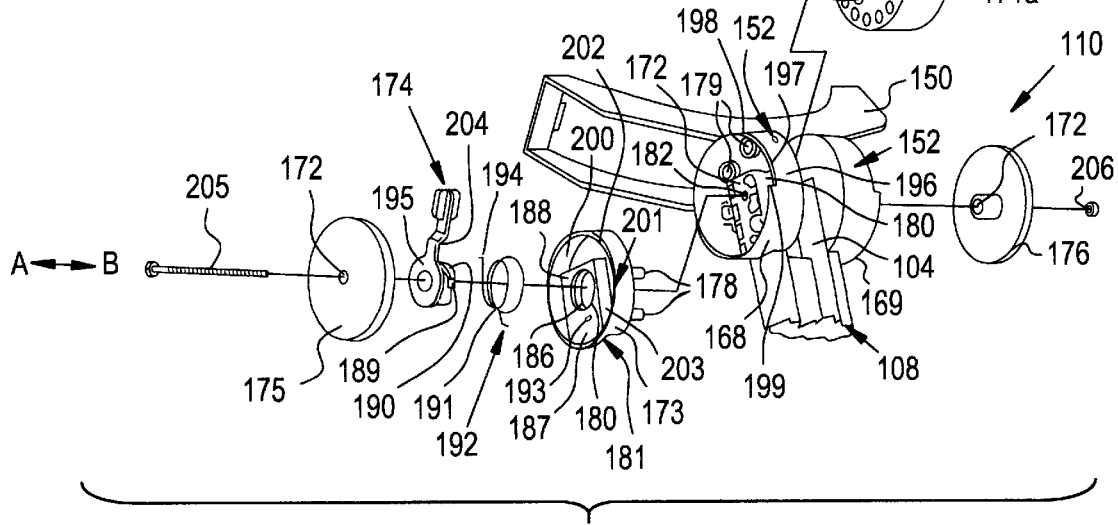

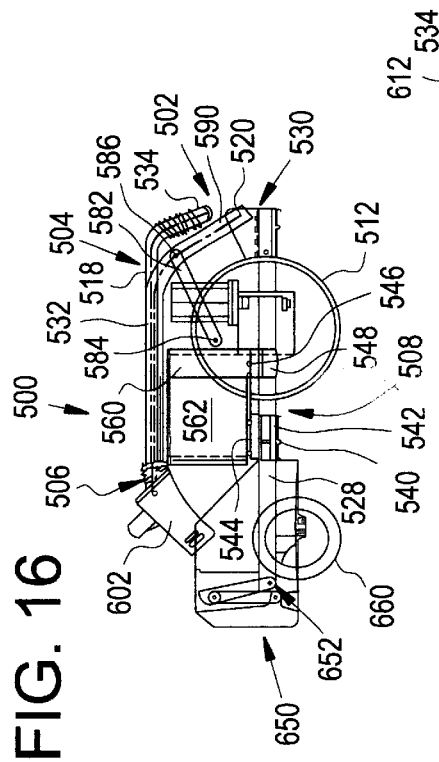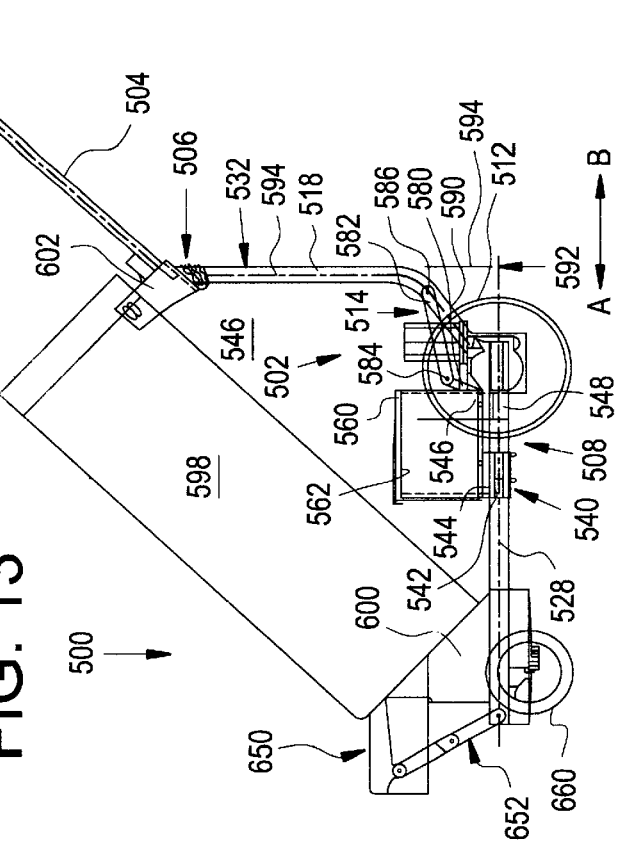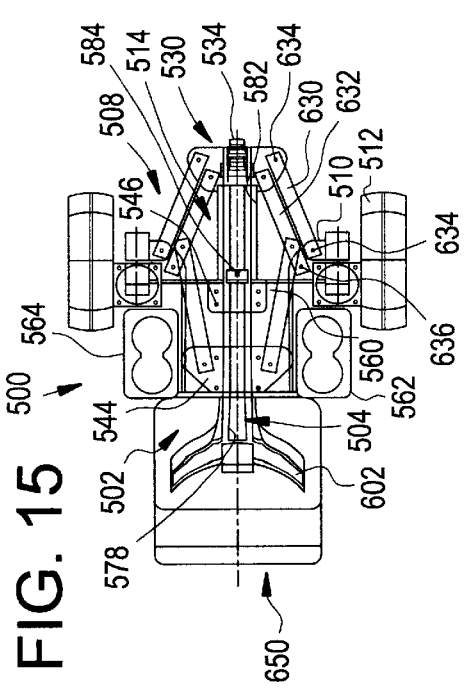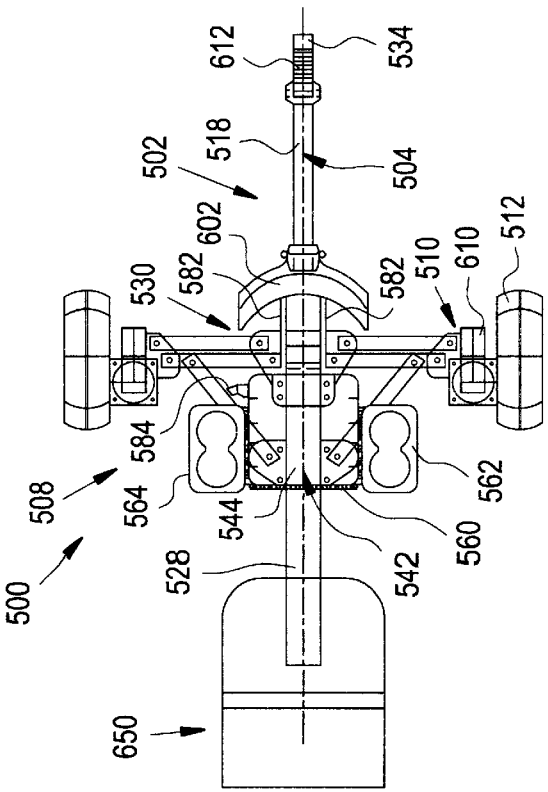

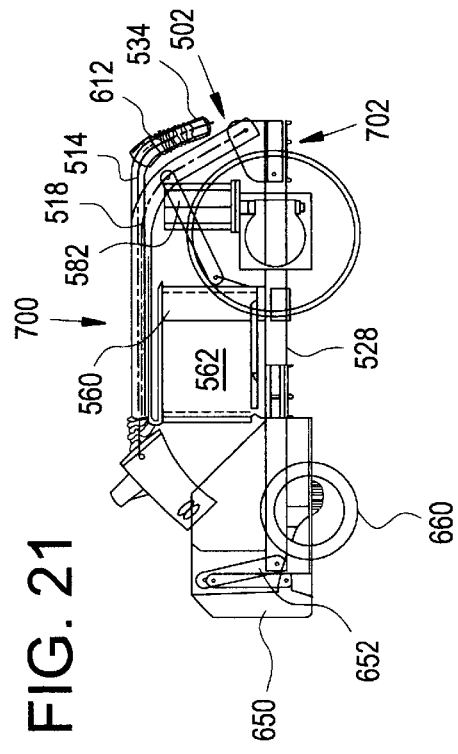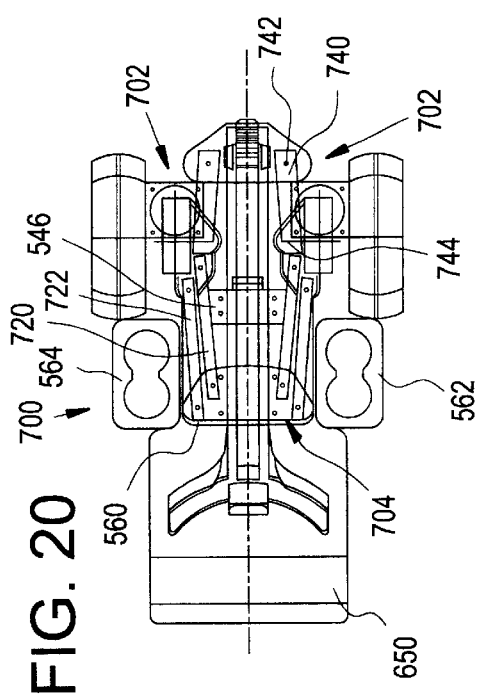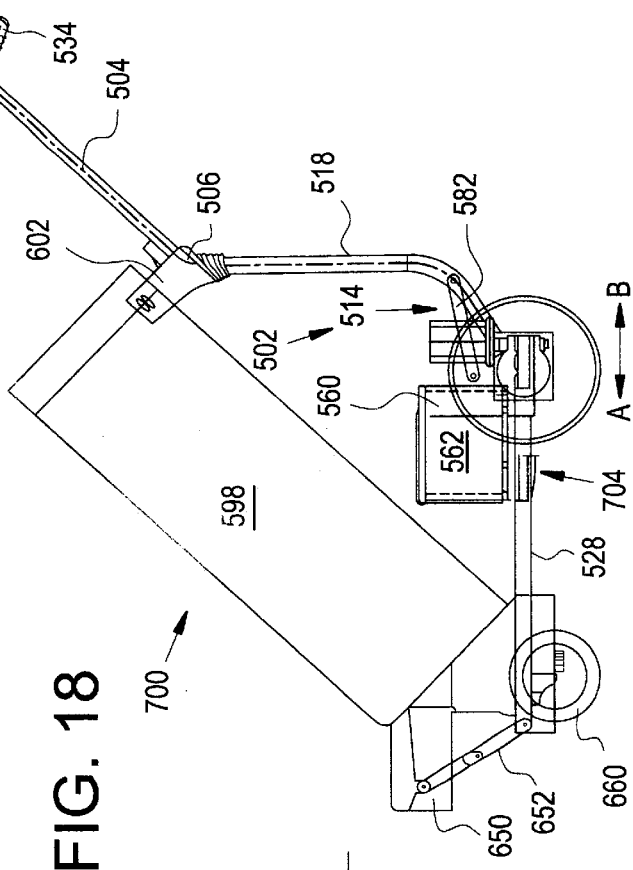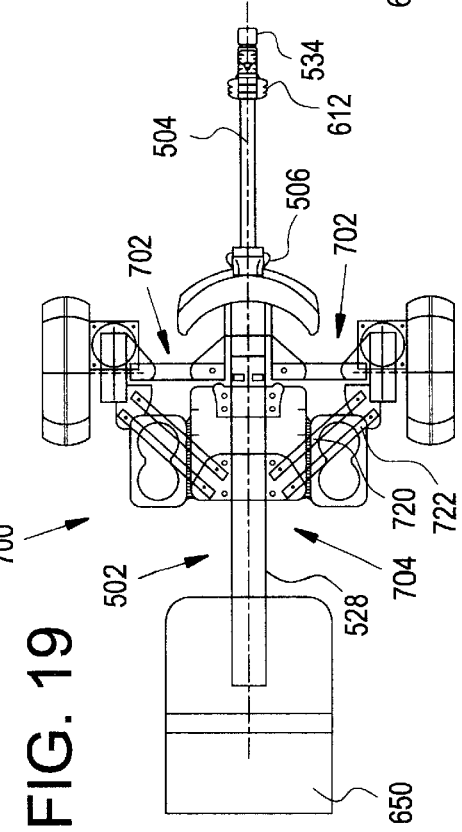

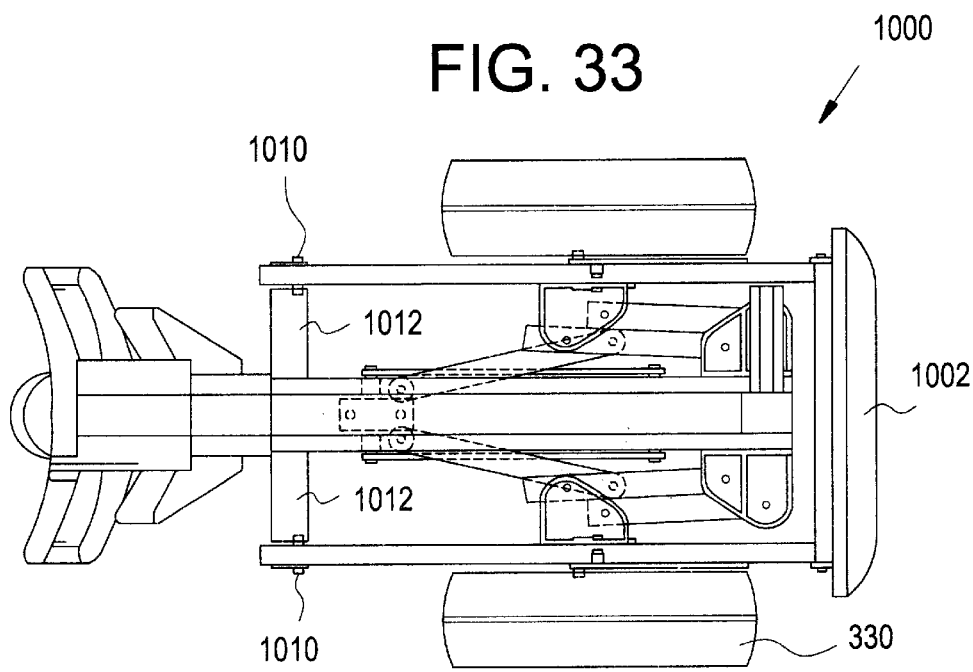
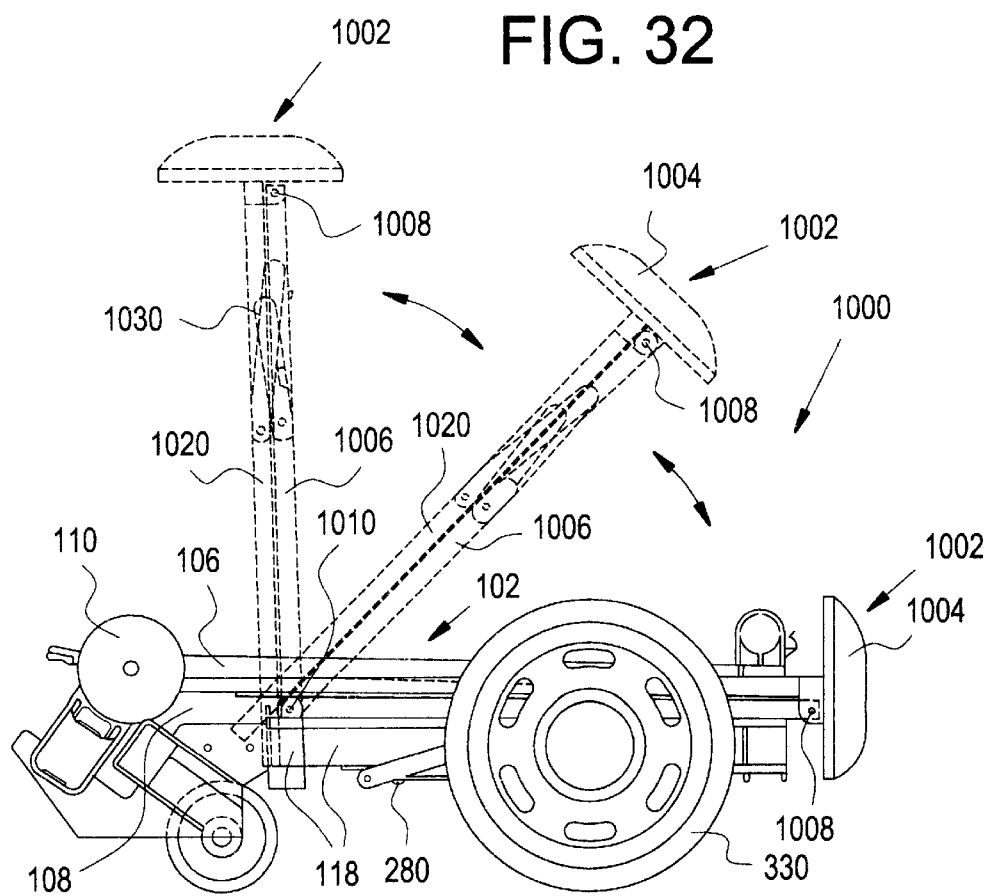

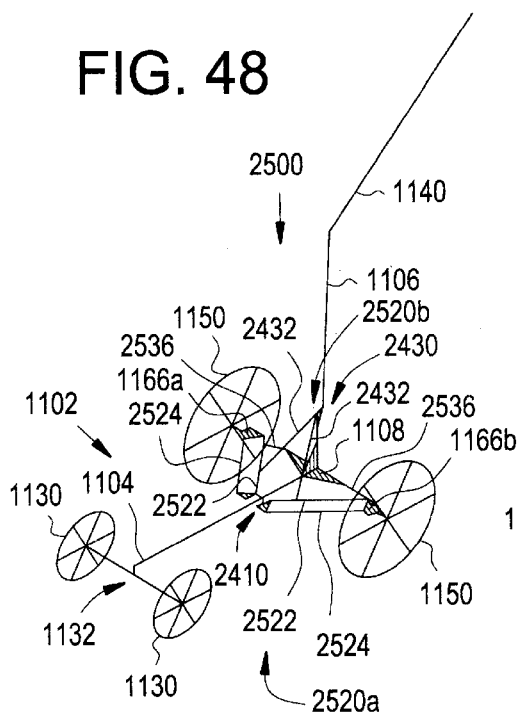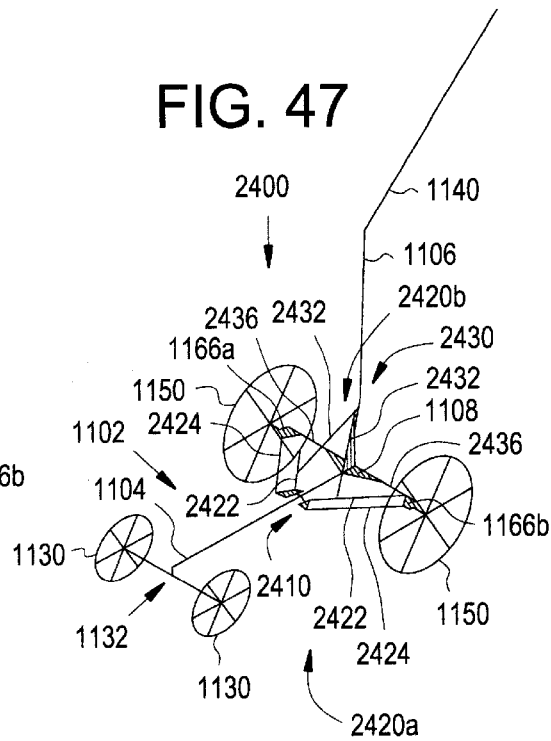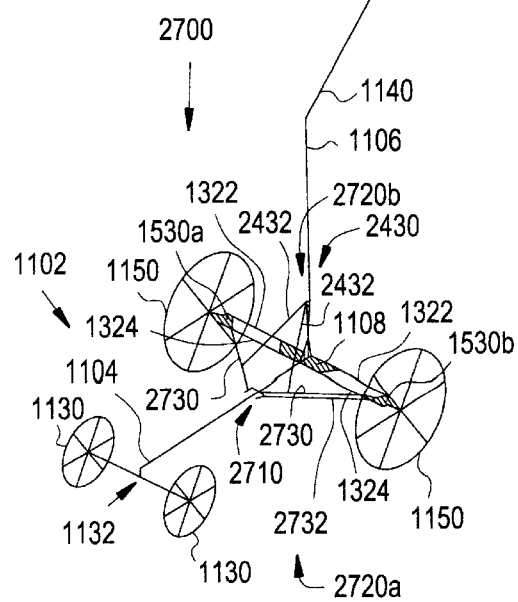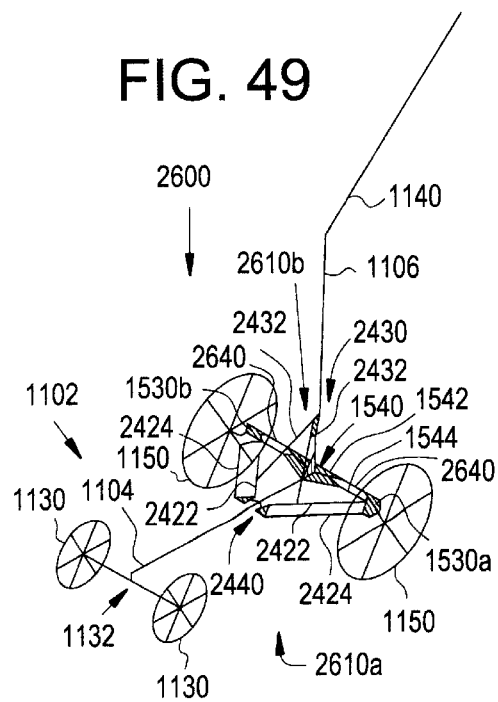

COLLAPSIBLE GOLF CART

BACKGROUND OF THE INVENTION-FIELD OF APPLICATION

This invention relates to golf carts of the type that are manipulated by the golfer and utilized to hold and transport golf clubs and other golfing paraphernalia around the golf course; and, more particularly, to such golf carts which are collapsible to facilitate transport and storage thereof.

BACKGROUND OF THE INVENTION-DESCRIPTION OF THE PRIOR ART

Golf is a very popular sport and pastime. Whether played by a professional or amateur the game requires a lot of walking and the necessity to bring along at least a set of clubs, a number of golf balls, and a requisite number of golf tees. Many golfers also like to bring with them something cool to drink, a towel or towels to dry off perspiration, golf gloves and other accessories. As the load increases so does the need for a load carrying and transport device.

Some golfers own and many golf courses rent vehicles to transport golfers, golfing equipment and whatever about the golf course. But golf vehicles, whether owned or rented can be costly and on many, if not most, course can only be driven on designated paths leaving significant territory to be walked and over which the golf equipment must be carried.

Wheeled golf carts constructed to carry the golfers golf bag with its clubs, balls, and tees are available in numerous sizes, shapes and designs. A variety of such carts, for example, are marketed by TITLEIST under various names such as "2000", "TORANDO", "ACE", "TURFGLIDER", "COMPETITION", "RENTAL" and "MERLIN"; and still other such carts are marketed under various model numbers and names under the AJAY, DOUBLE EAGLE, and MAX MANUAL trademarks.

Golf carts, of the type discussed hereinabove, are generally somewhat bulky in that they must accommodate at least a golf bag and are usually equipped with at least a pair of spaced wheels and a handle to facilitate moving and the direction of travel of the cart. Many such carts when not in use are themselves transported in trunks and back seats of cars or in other vehicles. To facilitate such transport some golf carts are constructed so that their wheels are removable and reattachable and with the remainder of the cart of frame-like construction that may or may not fold; such as the cart shown and described in U.S. Pat. No. 4,793,622 patented on Dec. 27, 1988 to T. Sydlow for "Compact Foldable Golf Cart" or both the wheels and handle may fold with the frame construction as shown and described in U.S. Pat. No. 4,142,736 granted on Mar. 6, 1979 to B. I. Ackerfeldt, et al for "Golf Cart". However, such golf carts are of a size and construction to only accommodate a golf bag and require separate hand folding of the handle, wheels and frame members.

Other golf cart constructions, such as those shown and described, by way of example: in U.S. Pat. No. 2,626,815 patented on Jan. 27, 1953 to J. F. Chamberlin for "Collapsible Golf Cart"; in U.S. Pat. No. 3,189,364 patented on Jun. 15, 1965 to R. A. Westphal for "Automatic Foldup Seat For Golf Cart"; in U.S. Pat. No. 3,459,434 patented on Aug. 5, 1969 to J. E. Dulaney for "Golf Cart"; and in U.S. Pat. No. 5,048,856 patented on Sep. 17, 1991 to M. A. Sanders et al for "Golf Trolley"; interconnect the handle of the golf cart to mechanism carried by the golf cart frame to move the wheels between extended and retracted positions. However, in such constructions the disposition of the wheel support and moving mechanisms on and about the golf bag support frame requires disposition of the golf cart handle, in its collapsed disposition, into a position generally parallel to the golf cart frame thus affecting the relative size of the collapsed golf cart in what might be an undesirable manner. In additions, these golf carts only provide golf bag support constructions except for the Westphal golf cart seat which is quite precariously disposed.

U.S. Pat. No. Re. 33,939 Reissued to A. Cheng on May 26, 1992 (originally patented as U.S. Pat. No. 4,946,186 on Aug. 7, 1990) for "Telescopic And Collapsible Golf Cart" shows a similar golf cart constructed to only carry a golf bag but wherein the golf cart main frame unfolds into a linear support member, suitable to only receive a golf bag and wherein the golf cart handle is slidably and telescopically received within one of the frame members.

Other golf cart constructions, such as those shown, by way of example: in U.S. Pat. No. 3,620,546 patented on Nov. 16, 1971 to J. H. Anderson for "Golf Cart With Club Rock Foldable By Cart Handle"; in U.S. Pat. No. 4,396,205 patented on Aug. 2, 1983 to G. Rosen for "Golf Cart"; and in U.S. Pat. No. 3,489,426 patented on Jan. 13, 1970 to J. R. J. Bond for "Combination Golf Cart And Golf Bag"; all incorporate golf club racks or golf bags into the golf cart construction thus detrimentally limiting their extent of collapsibility. U.S. Pat. No. 2,608,418 patented on Aug. 26, 1952 to T. R. Finlayson et al for "Collapsible Boat Trailer" shows and describes a frame like member for supporting and transporting a boat and wherein the entire boat support frame member must be pivoted about a wheel support frame to extend or retract the wheels.

Golf cart constructions such as described above do not provide space to accommodate much more than the golf bags themselves and most especially are not suitable for motorized wheel operation. A golf cart construction such as shown and described in U.S. Pat. No. 4,550,930 patented on Nov. 5, 1985 to J. D. Proffit for "Golf Caddy" on the other hand can accommodate not only a golf bag but an umbrella, seat, cooler, drink holder and other items but is in no way collapsible. Alternatively, golf cart constructions such as shown, by way of example: in U.S. Pat. No. 3,167,146 patented on Jan. 26, 1965 to R. R. Rudolph for "Power Driven Golf Cart"; in U.S. Pat. No. 4,657,100 patented on Apr. 14, 1987 to A. R. Lewis for "Portable Golf Cart" and as marketed under such tradenames as "HILLCREST", "T & T", "POWERCADDY" and "HILL BILLY" do provide battery powered motors to drive the golf cart. However: the Lewis golf cart wheels do not retract and extend thus resulting in what might be an unacceptable relatively large collapsed golf cart; the Rudolph golf cart requires frame mounted, handle operated wheel retraction and extension thus limiting the collapsed disposition of the golf cart handle; the "HILLCREST" and "POWERCADDY" golf carts must be physically disassembled and reassembled to facilitate transport creating undesirable labor and loss of time while taking a chance that parts may get lost; and only the handle for the "T & T" golf cart folds down but the wheels for the golf cart remain extended.

SUMMARY OF THE INVENTION

It is therefore an object of this invention to provide new and novel golf carts.

It is another object of this invention to provide new and novel collapsible golf carts.

It is yet another object of this invention to provide new and novel collapsible golf carts of a size and configuration to accommodate more than a golf bag if desired.

It is still another object of this invention to provide new and novel electric golf carts.

It is yet still another object of this invention to provide new and novel battery powered electric golf carts.

It is a further object of this invention to provide new and novel collapsible battery powered electric golf carts.

It is yet still a further object of this invention to provide new and novel handles for a collapsible golf cart.

It is yet still a further object of this invention to provide new and novel leg support and operating mechanisms for a golf cart.

It is yet still a further object of this invention to provide new and novel leg support and operating mechanisms for a collapsible golf cart.

It is yet still a further object of this invention to provide new and novel wheel mounting mechanisms for a collapsible golf cart.

It is yet still a further object of this invention to provide new and novel wheel extension and retraction mechanisms for a collapsible golf cart.

It is yet still a further object of this invention to provide new and novel frame structures for a collapsible golf cart.

It is yet still a further object of this invention to provide new and novel articulating frame structures for a collapsible golf cart such that articulation of such frame structures effects collapsing and erection of the golf cart.

It is yet still a further object of this invention to provide new and novel handle and frame structures for a collapsible golf cart.

It is yet still a further object of this invention to provide a handle for a collapsible golf cart that collapses into the golf cart frame.

It is yet still a further object o this invention to provide new and novel collapsible golf cart frame constructions that provide a support frame that forms a generally right angle carrying configuration.

It is yet still a further object of this invention to provide new and novel collapsible golf carts which mount umbrellas, coolers, seats and other items that also collapse.

It is yet still a further object of this invention to provide a plurality of wheel mounting, retraction and extension mechanisms for collapsible golf carts.

Other objects, features and advantages of this invention in its details of construction and arrangement of parts will be seen from the above and from the following description of the preferred embodiments when considered with the drawing and from the appended claims.

BRIEF DESCRIPTION OF THE DRAWING

In the drawing:

FIG. 4 is a schematic of the handle bar latching mechanism for the golf cart of FIGS. 1–3 showing the mechanism in a first disposition thereof;

FIG. 5 is a schematic similar to FIG. 4 but showing the mechanism in a second disposition thereof;

FIG. 6 is an exploded perspective showing of the handle bar latching mechanism of FIGS. 4 and 5;

FIG. 6a is a plan view of the face of a latching member for the handle bar latching mechanism of FIGS. 4–6;

FIG. 13 is a vertical side elevation view of an alternative embodiment of golf cart, incorporating the instant invention, showing the golf cart of FIGS. 1–10 for example, motorized, battery powered with accessory containers and seat;

FIG. 14 is a top plan view of the golf cart of FIG. 13;

FIG. 15 is a top plan view of the golf cart of FIGS. 13 and 14 showing same in the folded or collapsed disposition thereof;

FIG. 16 is a side elevation view of the golf cart of FIGS. 13–15 showing same in the folded or collapsed disposition thereof;

FIG. 18 is a vertical side elevation view of the golf cart of FIG. 17;

FIG. 19 is a top plan view of the golf cart of FIGS. 17 an 18;

FIG. 20 is a top plan view of the golf cart of FIGS. 17 and 19 showing same in the folded or collapsed disposition thereof;

FIG. 21 is a side elevation view of the golf cart of FIGS. 17–20 showing same in the folded or collapsed disposition thereof;

FIG. 32 is a side elevation view of the golf cart of FIGS. 29–31 in the folded disposition thereof but also showing, in phantom, the seat in raised and intermediate dispositions thereof;

FIG. 33 is a top plan view of the golf cart of FIGS. 29–32 showing same in its folded or collapsed disposition;

FIGS. 36–55 are schematics of golf carts similar to that of FIG. 35 each schematically showing another alternative embodiment of leg support and operating arrangement therefore each incorporating the instant invention;

DESCRIPTION OF THE PREFERRED EMBODIMENTS

Figure 1:
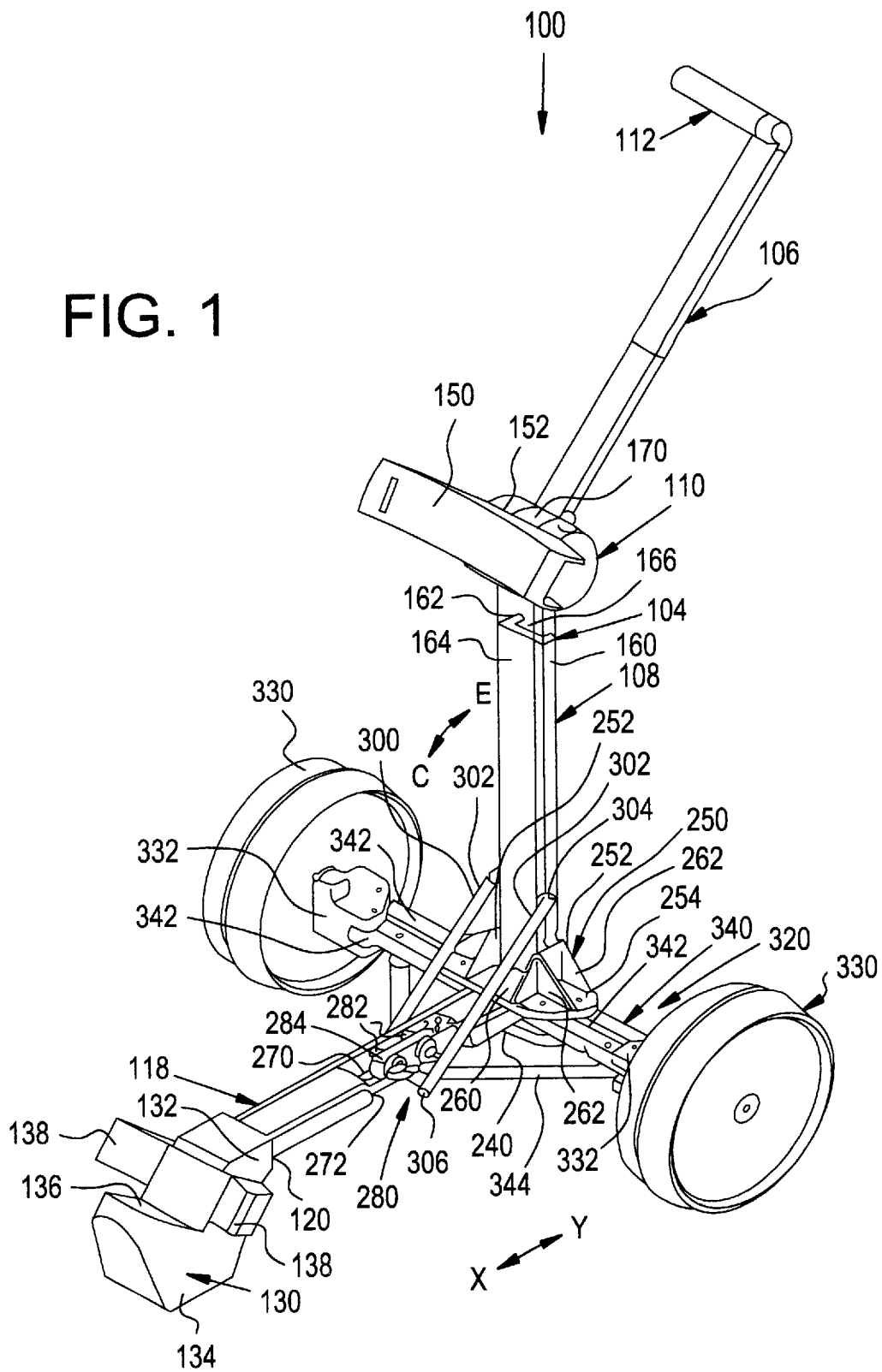
FIG. 1 is a perspective view of a foldable golf cart incorporating the instant invention, cut away in part to better show details of construction.
Figure 2:
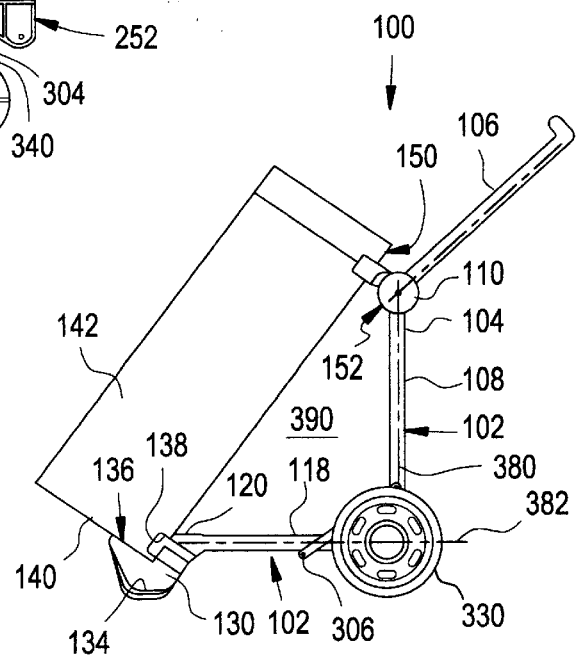
FIG. 2 is a vertical side elevation view of the golf cart of FIG. 1.
Figure 3:
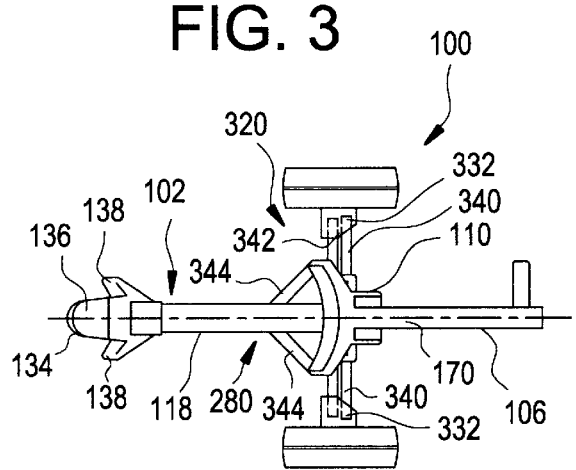
FIG. 3 is a top plan view of the golf cart of FIGS. 1 and 2.

With reference to FIGS. 1–3 there is generally shown at 100 a collapsible golf cart, caddy or trolley incorporating the instant invention. Cart 100 includes a cart main frame assembly 102 at one end 104 (FIGS. 1 and 2) of which is disposed a handle 106 secured to a first frame member 108 of main frame assembly 102 through a handle latch mechanism 110. A handle grip 112 extends from an end 114 of handle 106 and is of a size, configuration and surface treatment appropriate to facilitating gripping of grip 112 and moving of cart 100 by way of handle 106. A second frame member 118 of frame assembly 102 carries at an end 120 thereof a lower leg bracket, cradle or rest 130 secured to frame member 118 by suitable means such as threaded members 132 (FIG. 1) or the like. Leg bracket 130 provides a front rest 134 for cart 100 as well as a seat 136 and cradle arms 138 for the bottom 140 (FIG. 2) of a golf bag 142. An upper golf bag cradle 150 (FIGS. 1 and 2) is secured to the case 152 of latch mechanism 110. Straps (not shown) may be provided for cradles 138, 150 to hold golf bag 142 in place.

Frame members 108 and 118, of frame assembly 102, as well as handle 106 may be made of any suitable material such as steel, aluminum or other suitable metal or plastic of proper strength and other characteristics; while case 152 for latch mechanism 110, handle grip 112, leg bracket 130 and upper golf bag cradle 150 may be fabricated from metal or plastic or other suitable materials, or combinations thereof. Frame member 108 is formed as a generally "U" shaped channel with legs 160, 162 (FIG. 1) extending from a back 164 and providing a space 166 therebetween of a size and configuration to receive handle 106 which is sized to rest snugly within space 166 and to be easily pivoted thereinto and therefrom by way of latching mechanism 110 as will be hereinafter explained in greater detail.

Handle latch mechanism 110 (FIGS. 1, 2, and 4–6*a*) includes a pair of generally circular, generally cup shaped members 168, 169 (FIGS. 4–6) secured to end 104 of frame member 108 by suitable and conventional means such as riveting or bolting and spaced one from the other to receive therebetween a generally disc shaped end piece 170 similarly secured to the end of handle 106 opposite the end thereof to which handle grip 112 is secured. A plurality of holes or openings 171 (FIG. 6) are formed into or through end piece 170 spaced around a hole circle 171*a*. A bolt hole 172 extends through end piece 170, members 168 and 169 as well as through openings formed through a latching member 173 (FIGS. 6 and 6*a*), a latch operator 174 (FIG. 6) and a pair of end caps 175, 176. Upper golf bag cradle 150 may be formed integral with members 168 and 169 and so as to provide the required spacing therebetween or cradle 150 and members 168, 169 may be otherwise and suitably secured together to provide the required spacing between members 168, 169.

A set of latching projections 178, extending from latching member 173, are disposed thereon about a projection circle of the same diameter as hole circle 171*a* for holes 171 and are sized to extend from member 173 through holes 179 formed through the bottom of cup shaped member 168 and into holes 171 when latching member 173 is seated in member 168 as will be hereinafter explained. There are more holes 171 for handle 106 then projections 178. A locating boss 180 is formed within the cup of member 168 for coaction with a locating recess 181 (FIGS. 6 and 6*a*) formed into latching member 173 and a locating opening 182 (FIG. 6) extending through locating boss 180, is disposed for coaction with a suitably sized locating projection 183 (FIG. 6*a*) extending from latching member 173 in the same direction and to the same extent as projections 178. A pair of locating holes 184, 185 (FIG. 6) also extending into or through end piece 170, are sized and located for coaction with locating projection 183 to locate handle 106 in either its extended disposition when projection 183 seats in hole 185 or in the collapsed and nested position for handle 106 when projection 183 seats in hole 184 all as will be explained in greater detail hereinafter. Any suitable number of latching projections 178 may be provided but five projections 178 are shown in FIG. 6*a*. The number of holes 179 in cup member 168 will correspond to the number of projections 178; while the number of openings 171 in end piece 170 of handle 106 is selected to accommodate projections 178 when handle 106 is in its extended as well as its collapsed positions. When there are five projections 178 seven suitably placed openings 171 will be sufficient.

An opening 186, (FIGS. 6 and 6a) centrally formed through latching member 173 through a wall 187 of recess 181, has a pair of lugs 188 extending thereinto. A pair of spiral slots 189 (FIG. 6) are formed in a hub 190 of latch operator 174 each for coaction with a lug 188. A coil spring 191, formed with a first tip 192 that seats in a hole 193 formed in wall 187 (FIGS. 6 and 6a) and a second tip 194 (FIG. 6) that seats in a hole 195 formed in latch operator 174, is normally compressed between latch operator 174 and latching member 173 and urges latch operator 174 into its latch operated disposition (FIG. 5) wherein the walls of spirals 189 acting on lugs 188 move latching member 173 into member 168 so that latching projection 178 and locating projection 183 extend through holes 179 and 182 respectively. A circumferential wall 196 (FIG. 6) of member 168 is formed with a cut out 197 defined by an end wall 198 and an end wall 199. Latching member 173 is formed with a circumferential wall 200 that includes a cam portion 201 extending between a full position 202 of wall 200 and a narrow position 203 of wall 200. Full position 202 of wall 200 of latching member 173 is located in alignment with end wall 198 of wall 196 of member 168 and determines the latch operated disposition (FIG. 5) of latch operator 174; while narrow position 203 of wall 200 of latching member 173 is located in alignment with end wall 198 of wall 196 of member 168 and determines the latch released disposition (FIG. 4) of latch operator 174. A stem 204 of latch operator 174 extends through cut out 197. A bolt 205 sufficiently long enough to extend through mechanism 110 coacts with a nut 206 to hold mechanism 110 together.

When latching member 110 is fully assembled, end piece 170 of handle 106 is seated between cup members 168, 169 and latching members 173 is fully seated within the cup of member 168 with locating boss 180 seated in locating recess 181 of latching member 173. Spring 191 urges latch operator 174 into its latch operated disposition against wall 198 of cut out 197 (FIG. 5) and spring 191 and spirals 189 acting on lugs 188 urge latching member 173 into its disposition with its projections 178 extending through holes 179 of cup 168 and into holes 171 of end piece 170 of handle 106. If handle 106 is in its extended disposition (FIGS. 1 and 6) locating projection 183 of latching member 173 extends through opening 182 of member 168 and into opening 185 of end piece 170 of handle 106.

To move handle 106 to its collapsed or nested position within space 166 of frame member 108 latch operator 174 is rotated to its FIG. 4 disposition. When so rotated spiral slots 189 of operator 174 will coact with lugs 188 of latching member 173 to draw member 173, in the direction of arrow "A" (FIG. 6), against the action of spring 191, towards latch operator 174 thus withdrawing latching projections 178 and locating projection 183 into cup 168 and out of holes 171 and 185 respectively of end piece 170 of handle 106. The narrowing of cam surface 201 of latching member 173 and cut out 197 of member 168 permit such movement of latching member 173 with respect to member 168.

When projections 178 and 183 have been so withdrawn from handle end piece 170 handle 106 may be rotated about the axis of bolt 205 in the direction of arrow "R" (FIG. 6). Latching member 173 is prevented from returning to its latching disposition due to the coaction of the tip of locating projection 183 with the surface of end piece 170 of handle 106 at all possible positions of handle 106 except when locating projection 183 is aligned with either locating hole 185 or locating hole 184 of end piece 170. In such intermediate positions handle 106 may still be used to move cart 100 but handle 106 will be rockable with respect to frame member 108 in such intermediate positions.

Figure 9:
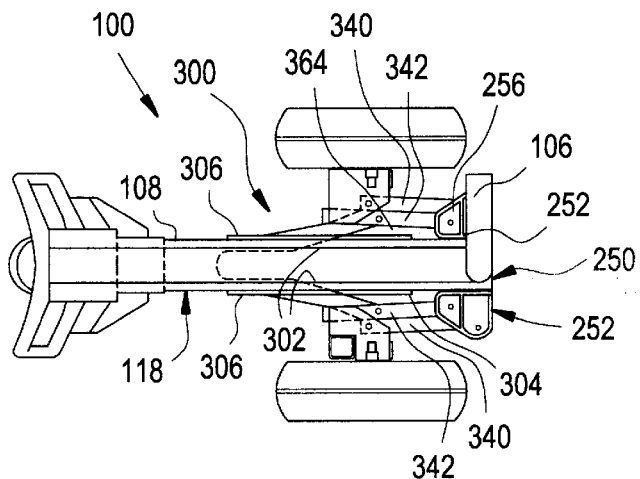
FIG. 9 is a top plan view of the golf cart of FIGS. 1–3 showing same in the folded or collapsed disposition thereof.
Figure 10:
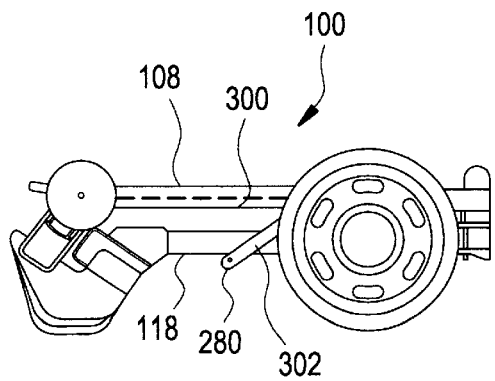
FIG. 10 is a side elevation view of the golf cart of FIGS. 1–3 showing same in the folded or collapsed disposition thereof.

Once handle 106 has been fully rotated (in the direction of arrow "RR") so that it seats in space 166 of frame member 108 hole 184 of end piece 170 will align with locating projection 183 and the action of spring 191 will rotate latch operator 174 in the direction of arrow "S" so that stem 204 of operator 174 acts upon cam wall 201 of latching member 173 and moves member 173 in the direction of arrow "B". Latching projections 178 will extend out from member 168 into aligned holes 171 of end piece 170 and handle 106 will be latched in its collapsed or nested disposition (FIGS. 9 and 10).

Figure 7:
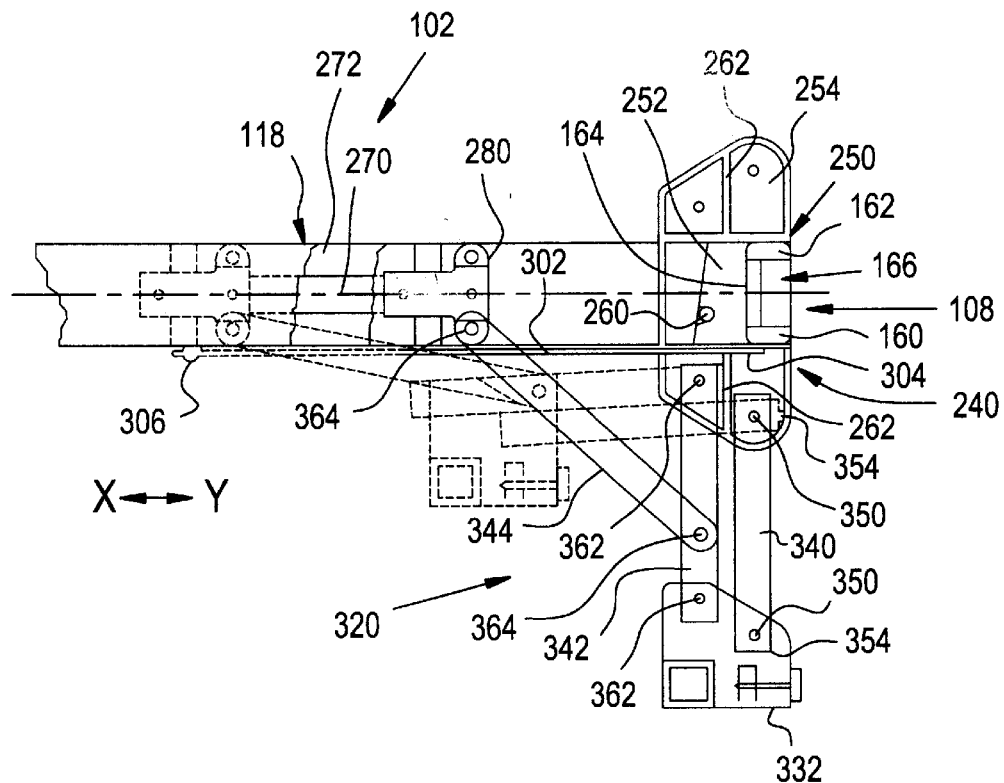
FIG. 7 is a partial plan view of a portion of the golf cart of FIGS. 1–3 enlarged to better show details of the leg support and operating arrangement therefore in a first (solid line) and second (dashed line) disposition thereof.
Figure 8:
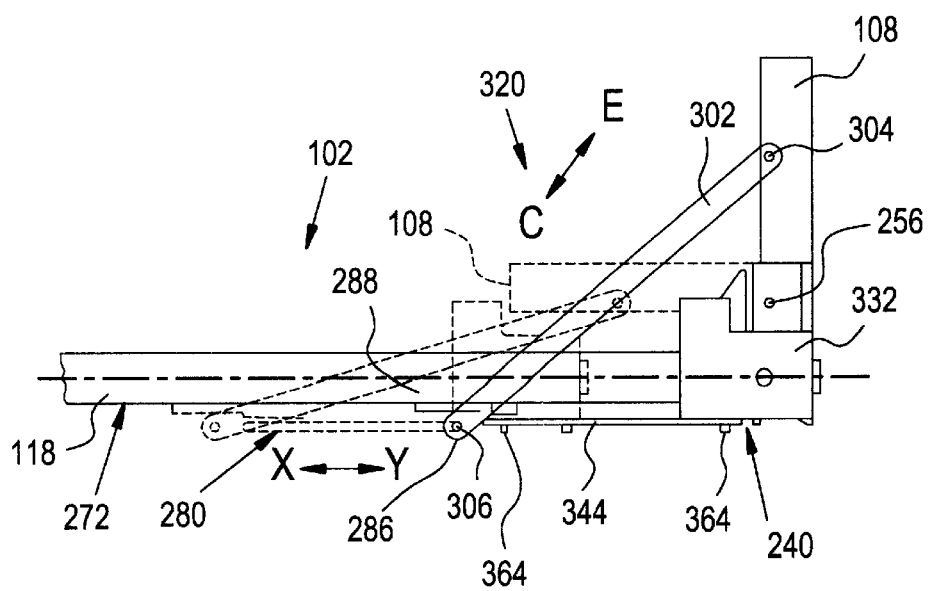
FIG. 8 is a side elevation view of the mechanism shown in FIG. 7.

Frame member 118 is formed as a hollow tube of generally rectangular cross section closed at end 120 by bracket 130 and at its other end 240 (FIG. 1) by a main joint member 250. A pair of spaced side plates 252 extend up from a top plate 254 of member 250 and pivotally receive therebetween frame member 108 for pivoting movement about a pivot pin 256 (FIG. 8). Suitable securing means such as one or more threaded members 260 (FIGS. 1 and 7) connect joint member 250 to frame member 118. Gusset plates 262 may also be provided to support plates 252 on top plate 254. An elongated slot 270 is formed through a bottom wall 272 of frame member 118. A slide set 280 of a size and configuration to fit and move within the hollow of tubular frame member 118 includes a pair of wheels 282 disposed on each side of a slide member 284. A pin receiving hub 286 (FIG. 8) extends down from slide member 284 through slot 270. A strip of material 288 such as metal, plastic or the like is disposed like a window shade within frame member 118 and is connected to slide member 284 to unwind when slide set 280 is in the erected disposition of cart 100 and thus cover slot 270 when cart 100 is in use; and to rewind when cart 100 is collapsed and slide set 280 is in its appropriate disposition.

A side support mechanisms operating device 300 extends between slide set 280 and frame member 108 such that pivoting movement of frame member 108 in the direction of arrow "C" (FIGS. 1–8) about pivot pin 256, from an erect disposition for member 108 to a collapsed or folded disposition for member 108 (in phantom FIG. 8 and in full lines in FIGS. 9 and 10) effects movement of slide set 280 in the direction of arrow "X" (FIGS. 1, 7 and 8) and pivoting movement of member 108 about its pivot 256 in the direction of arrow "E" effects movement of slide set 280 in the direction of arrow "Y". Operating device 300, in this instance comprises a pair of straps 302 each pivotally connected at one end 304 thereof to frame member 108 and at the other end 306 thereof to slide set 280. While the movement of slide set 280 in the directions of arrows "X" and "Y" has been described above as resulting from pivoting movement of frame member 108 towards and away from frame member 118 it should be understood that slide set 280 will move due to any relative movement of frame members 108, 118 towards and/or away from each other. Straps 302 and their pivoting connections to frame member 108 and slide set 280 have been characterized as a side support mechanisms operating device (300) because the movement of slide set 280, due to the relative pivoting movements of frame members 108 and 118 towards and away from each other, effects operation of a pair of side support mechanisms 320 (FIGS. 1, 7 and 8) that, in turn, support and effect movement of side supports 330 (FIG. 1) for golf cart 100 between extended dispositions (FIGS. 1 and 3) and retracted dispositions (FIGS. 9 and 10). Side supports 330 for golf cart 100 are shown as wheels each rotatably mounted to wheel mounts 332.

Side support mechanisms 320 may include a number of different arrangements to mount wheel mounts 332 and wheels 330 for movement between said extended and retracted dispositions. Golf cart 100 utilizes for each of its side support mechanisms 320 a pair of horizontally aligned support bars 340, 342 (FIGS. 1 and 7), that extend out from main joint 250 and connect a respective wheel mount 332 and wheel 300 to main joint 250, and a connecting strap 344 that connects respective support bars 342 to slide set 280. All such connections are about vertically disposed pivot pins with pivot pins 350 pivotally connecting support bar 340 between spaced side arms 352 (FIG. 8) of main joint 250 and between spaced side arms 354 of wheel mount 332; and pivot pins 362 pivotally connecting support bars 342 between said spaced side arms 352 and said spaced arms 354. The arrangement of support bars 340, 342 their pivot pins 350, 362 and of arms 352, 354 creates a parallel linkage action for bars 340, 342. Similar pivot pins 364 pivotally connect connecting straps 344 to slide set 280 and to respective support bars 342.

Movement of slide set 280 in the direction of arrow "X" (FIGS. 1, 7 and 8), upon relative movement of frame members 108 and 118 towards each other and due to operating straps 302, will effect pivoting movement of connecting straps 344 about their pivots 364 and corresponding movement of support bars 340, 342 about pivots 350, 362 to draw support bars 340, 342, connecting straps 344, wheel mounts 332 and wheels 330 inwardly towards frame member 118 from the extended dispositions thereof (FIGS. 1 and 3) to retracted or collapsed dispositions thereof (FIGS. 9 and 10). Movement of slide set 280 in the direction of arrow "Y" (FIGS. 1, 7 and 8), upon relative movement of frame members 108 and 118 away from each other due to the aforedescribed side support mechanisms operating device 300 and its operation of side support mechanisms 320, will move support bars 340, 342, connecting straps 344, wheel mounts 332 and wheels 330 from their retracted or collapsed dispositions (FIGS. 9 and 10) into their extended dispositions (FIGS. 1 and 3). Other arrangements of operating devices and side support mechanisms, usable with golf cart 100 will be described hereinafter. Configuration that transmits the load carried by cart 100 through wheels 330 as well as through support 134; and that furthermore a space 390 is provided between frame members 108 and 118 and golf bag 142 for any suitable purpose.

It should be noted that center lines 380 (FIG. 2) and 382 that extend through frame members 108 and 118 respectively intersect at a right angle when members 108 and 118 are fully extended thus providing a relatively sturdy golf cart.

Figure 11:
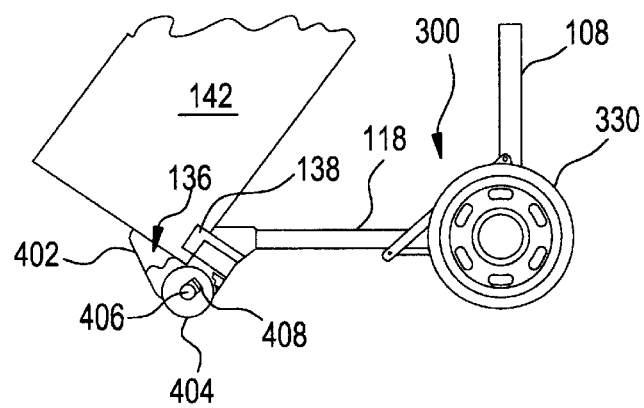
FIG. 11 is a side elevation of an alternative forward support incorporating the instant invention for the golf carts of the instant invention, but showing same mounting a wheel for the golf cart of FIGS. 1–10.

Golf cart 400 of FIG. 11 is constructed substantially identical to golf cart 100 of FIGS. 1–10 except that it is provided with a forward support, bracket or cradle 402 that rotatively mounts a forward wheel 404 for rotation about an axle 406. A wheel brake 408, conventional in structure and operation, coacts with wheel 404 to either prevent or permit rotation thereof.

Figure 12:
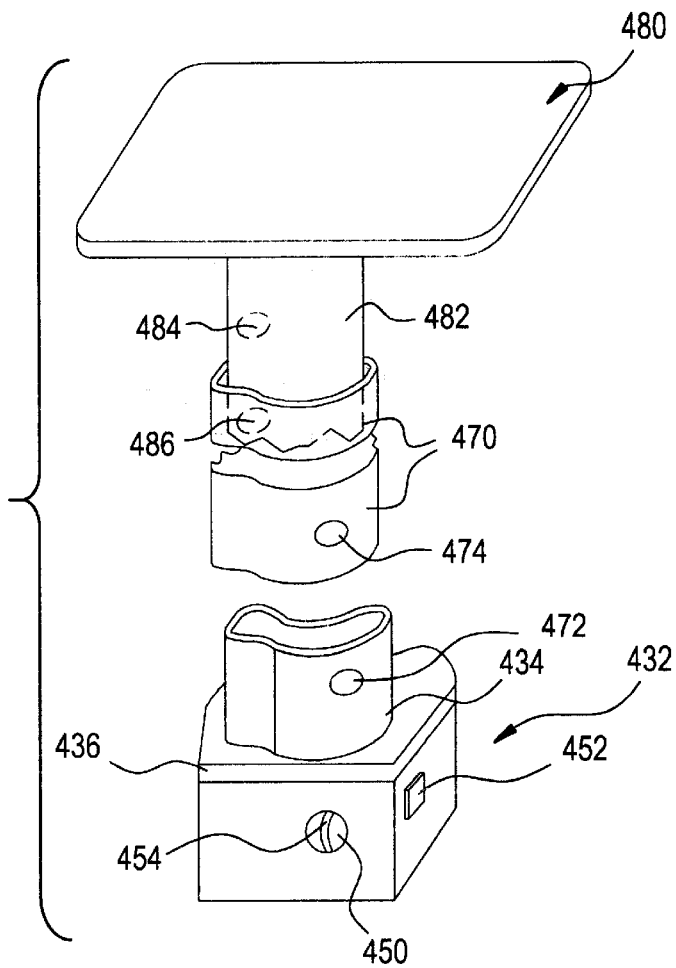
FIG. 12 is a side elevation of an alternative wheel attachment mechanism, incorporating the instant invention, for the golf carts of the instant invention but showing same for use, for example, with the golf cart of FIGS. 1–10, cut away in part to better show details thereof.

In FIG. 12 there is shown a wheel mount 432 that is substantially identical to wheel mount 332 of cart 100 (FIGS. 1–10) except that it is provided with a mounting post 434 that extends up from a top plate 436 of mount 432. An opening 450 extends into mount 432 to receive an axle (not shown) that extends out from a wheel (like wheel 330, FIG. 1) to be mounted therein. A button 452 is urged into the position shown therefore in FIG. 12 by a spring (not shown) in a conventional manner and so that a curved section 454 of a slide plate carried by button 452 will be disposed in a groove (not shown) formed conventionally in the axle of the wheel. Button 452 is moved in the direction of arrow "A" to permit removal of the wheel axle from opening 450 of mount 432 or to insert a wheel axle thereinto. Release of button 452 permits its spring bias to move button 452 in the direction of arrow "B" to return button 452 to its FIG. 12 disposition thus projecting curved section 454 into the groove on the wheel axle to retain same in mount 432 and the wheel rotatively mounted thereto.

Mounting post 434 is of a size and configuration to receive an extension post 470 that is formed of suitable material (such as steel, aluminum, plastic or the like) and into a hollow tubular shape of the same cross section as post 434 but with an inside configuration identical to but slightly larger than the outside configuration of post 434 so that post 470 may be snugly slipped over post 434 and be mounted thereon. If desired a spring biased detent 472 may extend from post 434 to be received in an opening 474 in extension post 470 to further assist keeping extension post 470 in position or post 434.

An auxiliary device or appliance 480 may thereafter be mounted on top of post 470. Appliance 480 may be any item suitable or useful by a golfer. In FIG. 12 appliance 480 is shown as a seat. A mounting post 482 is secured by conventional means beneath seat 480. Post 482 is substantially identical to post 434 in that its outside configuration is sized and configured to be received within the hollow of extension 470. A spring biased detent 484, like detent 472, is positioned to be received within an opening 486 formed through post 470 to facilitate disposition of seat 480 atop post 470.

FIGS. 13 and 14 show the erected disposition of a golf cart 500 similar to cart 100 (FIGS. 1–10) but a cart that is battery powered, motorized and provided with additional accessories to be hereinafter described. FIGS. 15 and 16 show cart 500 in its collapsed and folded disposition.

Cart 500 includes: a leg frame assembly 502; a handle 504 connected to leg frame assembly 502 through a latch mechanism 506; side support mechanisms 508 carrying wheel mounts 510 and wheels 512; and a side support mechanisms operating device 514; all of which are somewhat similar in construction and operation to corresponding assemblies, mechanisms and devices for cart 100 (FIGS. 1–10) and facilitate and enable cart 500 to be either in its erected disposition (FIGS. 13 and 14) or its collapsed or folded disposition (FIGS. 15 and 16).

Frame assembly 502, similar to frame assembly 102 of cart 100, includes a first frame member 518 pivotally connected at 520 to a second frame member 528 through a main joint 530; with handle 504 pivotally carried by frame member 518 for disposition in either a handle extended disposition (FIGS. 13 and 14) or a handle collapsed disposition (FIGS. 15 and 16) nested in a slot 532 formed in frame member 518. Latch mechanism 506 connects handle 506 to frame member 518 to facilitate such extended and nested dispositions in a manner similar to latch mechanism 110 for handle 106 and frame member 108 of cart 100. A hand grip 534 is disposed at the free end of handle 504.

Second frame member 528 carries a slide set 540 similar in disposition and function to slide set 280 of cart 100 in that it includes a wheeled carriage 542 that travels within the hollow of frame member 540. However, slide set 540 also includes a top plate 544 suitably connected to wheeled carriage 542 and a guide member 546 spaced from carriage 542 towards frame member 518 and which includes side arms 548 that extend down proximate frame member 528. A battery tank 560 is carried on top of and spanning top plate 544 and guide member 546 and a pair of accessory tanks 562, 564 are respectively disposed to each side of battery tank 560 and are suitably connected thereto. Covers (not shown) may be provided for or with battery tank 560 and accessory tanks 562, 564. Accessory tanks 562, 564 may serve as coolers for beverages and food or for storage or any other suitable purpose. A connecting piece 580 extends up from guide member 546 and pivotally receives first ends of operating straps 582 at 584; the other ends of operating straps 582 being pivotally connected to frame member 518 at 586. As such, pivotal movement of frame member 518 about pivot 520 or relative movement of frame members 518, 528 with respect to each other, through slide set 540 and operating straps 582 effects movement of slide set 540 in the directions of either arrow "A" or arrow "B" (FIG. 13) depending upon whether frame member 518 is moving towards or away from frame member 528 (or whether they are moving towards or away from each other).

It should be noted that frame member 518 has a curved section 590, proximate where member 518 pivotally connected to member 528, so that when frame member 518 is in its collapsed or folded disposition (FIGS. 15 and 16) it may accommodate tanks 560, 562 and 564. Even so it should be further noted that a center line 592 (FIG. 13) through frame member 528 will intersect with a center line 594 that extends through the non-curved portion of frame member 518 at an angle of ninety degrees thus still providing a space 596 beneath a golf bag 598 when disposed on lower cradle or rest 600 and upper cradle 602. Space 596 may be used to position suitable and desirable accessories.

Each wheel mount 510 carries a gear motor set 610 of conventional construction and operation and which is connected to and drives its respective wheel 512. Conventional electrical wiring interconnects gear motor sets 610 to a battery (not shown) when disposed in battery tank 560 and to controls 612 carried by handle 504 proximate grip 534.

Each wheel mount 510 is also supported by and pivotally connected to its respective side support mechanism 508 and, through connection straps 624 thereof, pivotally connected to slide set 540. Side support mechanisms 520 are identical in construction and operation to side support mechanisms 320 of cart 100 and each include a pair parallel support bars 630, 632 pivotally connected at their respective ends to main joint 530 and wheel mount 510 at 634, and 636 respectively. As such movement of slide set 540 (as hereinabove described) will, through its pivotal connections to connection straps 624 pivot support bars 630, 632 to either draw wheels 512 in towards folded frame members 518, 528 or move wheels 512 out away from frame members 518, 528 until cart 500 is in its fully erected disposition (FIGS. 13 and 14). Other side support mechanisms and operating devices therefore to be hereinafter described may be utilized for cart 500.

Front bag rest 600 also mounts an auxiliary accessory 650 by way of a linkage arrangement 652. Accessory 650 may be a seat or a compartment or a compartment covered with a seat. Operation of linkage arrangement 652 facilitates disposition of accessory 650 into an operative disposition when cart 500 is in its extended disposition (FIGS. 13 and 14) and into a stowed disposition when cart 500 is in its collapsed or folded disposition (FIGS. 15 and 16). Either a single forward wheel 660 or a pair of such wheels may be rotatively mounted on frame member 528 beneath front rest 600. A hand brake may be provided for wheel(s) 660 as desired.

Figure 17:
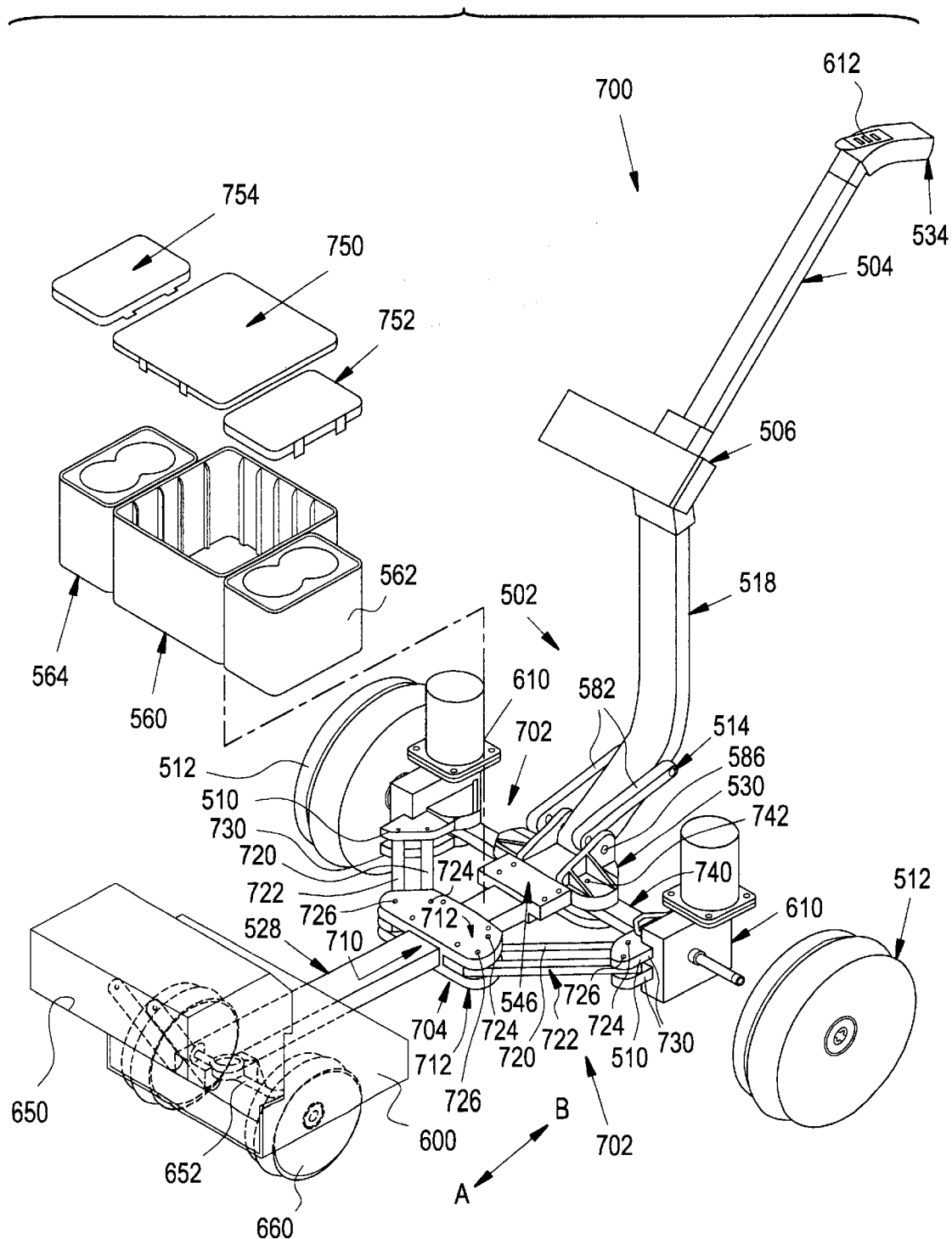
FIG. 17 is a perspective view of yet another alternative embodiment of golf cart, incorporating the instant invention; exploded in part to better show details thereof and showing a motorized, battery powered golf cart similar to that of FIGS. 13–16 but with an alternative leg support and operating arrangement also incorporating the instant invention.

FIGS. 17–19 show the erected disposition of a golf cart 700 and FIGS. 20 and 21 show cart 700 in its collapsed or folded disposition. Cart 700 is substantially identical to cart 500 (FIGS. 13–16) but is instead provided with side support mechanisms 702 and a slide set 704 that are different in structure and arrangement from side support mechanisms 508 and slide set 540 of cart 500 but which provide an effective extension and collapse for cart 700 that is quite similar to that provided for carts 500 and 100.

Thus, cart 700 includes: main frame assembly 502 with frame members 518 and 528; a handle 504 pivotally connected to frame member 518 through latch mechanism 506; wheel mounts 510 and wheels 512 driven through gear motor sets 610 electrically connected to a battery disposed in battery tank 560 and controlled by controls 612; and side support mechanisms operating device 514 acting through operating straps 582 and slide set 704 to operate side support mechanisms 702.

Slide set 704, like previously described slide sets 280 (cart 100) and 540 (cart 500) includes a wheeled carriage disposed within the hollow of frame member 528 for movement in directions of arrow "A" and "B" (FIGS. 17 and 18) and which, similar to slide set 540 (of cart 500) includes a slide guide 546 connected to the wheeled carriage and disposed on top and to the sides of frame member 528 to guide the movement of slide set 704. A side support mounting device 710 including a pair of spaced arms 712 is carried by slide set 704 by being appropriately secured to an extension of the slide member carried by the slide wheels of slide set 704 and which extends down through the elongated slot provided in frame member 528 and described above for frame member 118 of cart 100. The difference then between side support mechanisms 702 of cart 700 and side support mechanisms 320 and 508 respectively of carts 100 and 500 is that the support bar(s) for wheel mounts 510 of cart 700 extend between slide set 704 and wheel mounts 510 and the connection straps for mechanisms 702 extend between the wheel mount 510 and main joint 530 instead of the other way around for carts 100 and 500. Thus, a pair of horizontally aligned support bars 720, 722 are each pivotally connected as at 724, 726 between spaced arms 712 of each mounting device 710 and extend therefrom to wheel mounts 510 whereat they are pivotally connected at 724, 726 respectively between spaced arms 730 carried by each wheel mount 510. Connection straps 740 for each side support mechanism are pivotally connected as at 742 to main joint 530 and at 744 to wheel mounts 510. Parallel bars 720, 722 and their aforedescribed pivotal connections between slide set 704 and wheel mounts 510 form a parallel action mechanism as hereinabove described.

Covers 750, 752 and 754 are provided for battery tank 560 and accessory tanks 562, 564 respectively.

The operation of side support mechanisms 702 and the operating device therefore is the same, however, as described above for the comparable mechanisms and devices for carts 100 and 500.

Figure 25:
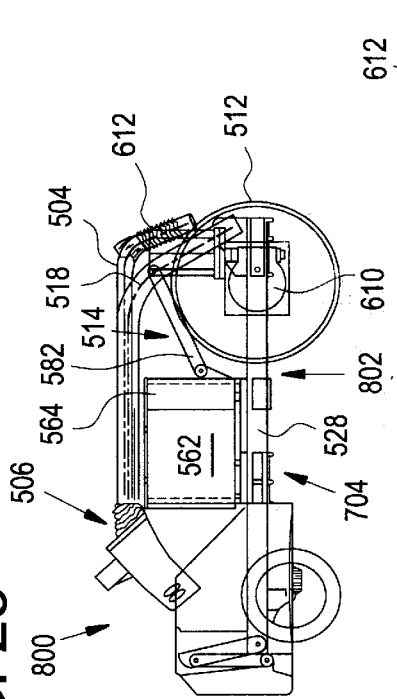
FIG. 25 is a side elevation view of the golf cart of FIGS. 22–24 showing same in the folded or collapsed disposition thereof.
Figure 22:
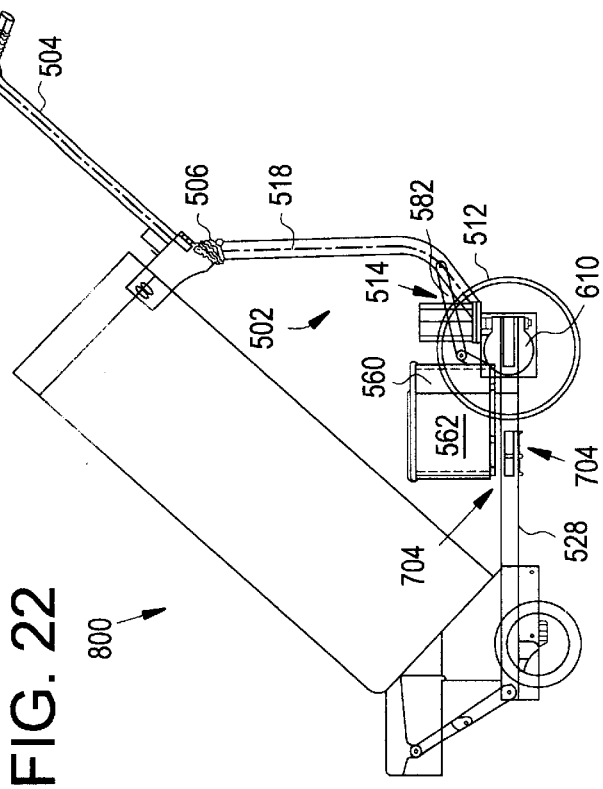
FIG. 22 is a vertical side elevation view of yet another alternative embodiment of golf cart, incorporating the instant invention, showing a golf cart similar to that of FIGS. 13–21 but with yet another alternative leg support and operating arrangement incorporating the instant invention.
Figure 24:
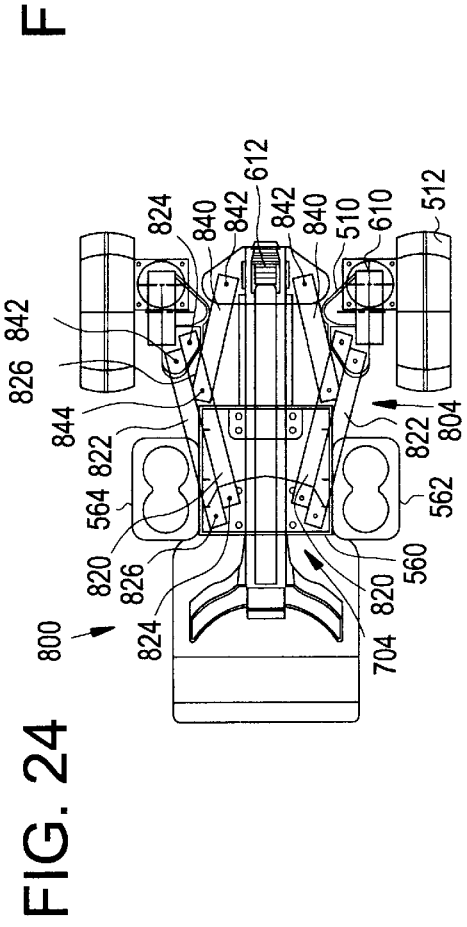
FIG. 24 is a top plan view of the golf cart of FIGS. 22 and 23 showing same in the folded or collapsed disposition thereof.
Figure 23:
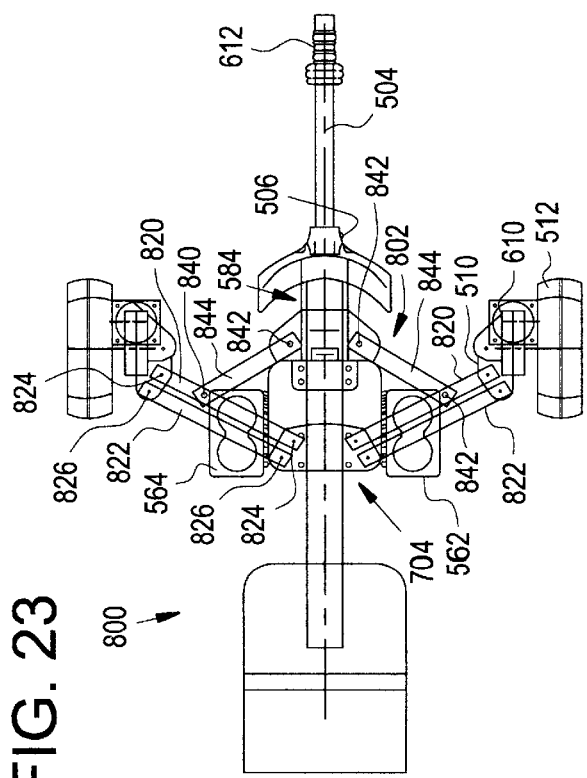
FIG. 23 is a top plan view of the golf cart of FIG. 22.

FIGS. 22 and 23 show the erected disposition of a golf cart 800 and FIGS. 24 and 25 show cart 800 in its collapsed or folded disposition. Cart 800 is substantially identical to cart 700 (FIGS. 17–21) but is instead provided with side support mechanisms 802 that are different in structure and arrangement from side support mechanisms 702 of cart 700 but which provide an effective extension and collapse for cart 800 that is quite similar to that provided for carts 700, 500 and 100.

Thus, cart 800 includes: main frame assembly 502 with frame members 518 and 528; a handle 504 pivotally connected to frame member 518 through latch mechanism 506;

wheel mounts 510 and wheels 512 driven through gear motor sets 610 electrically connected to a battery disposed in battery tank 560 and controlled by controls 612; and side support mechanisms operating device 514 acting through operating straps 582 and slide set 704 to operate side support mechanisms 802; all as previously described with respect to cart 700 except for mechanisms 802.

The difference then between side support mechanisms 802 of cart 800 and side support mechanisms 702 of cart 700 is that while the support bar(s) for wheel mounts 510 of cart 800 extend between slide set 704 and wheel mounts 510 the connection straps for mechanisms 802 extend between main joint 530 and one of the support bars instead of pivoting to wheel mount 510. Thus, a pair of horizontally aligned support bars 820, 822 are each pivotally connected as at 824, 826 between spaced arms 712 of each mounting device 710 and extend therefrom to wheel mounts 510 whereat they are pivotally connected at 824, 826 respectively between spaced arms 730 carried by each wheel mount 510. Connection straps 840 for each side support mechanism 802 are pivotally connected as at 842 to main joint 530 and at 844 to support bars 820. Parallel bars 820, 822 and their aforedescribed pivotal connections between slide set 704 and wheel mounts 510 form a parallel action mechanism as hereinabove described.

The operation of side support mechanisms 802 and the operating device therefore is the same, however, as described above for the comparable mechanisms and devices for carts 100, 500 and 700.

Figure 28:
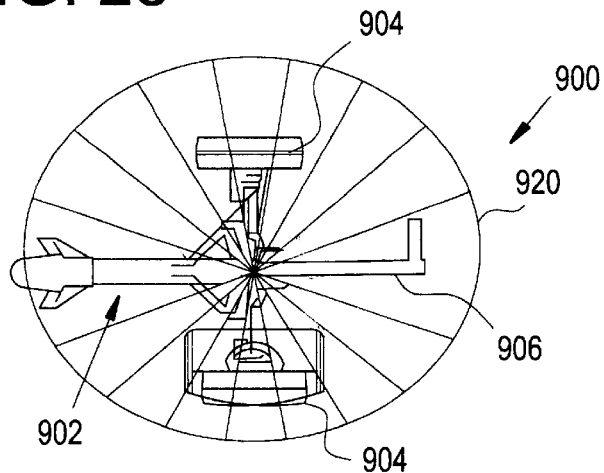
FIG. 28 is a top plan view of the golf cart of FIGS. 26 and 27.
Figure 26:
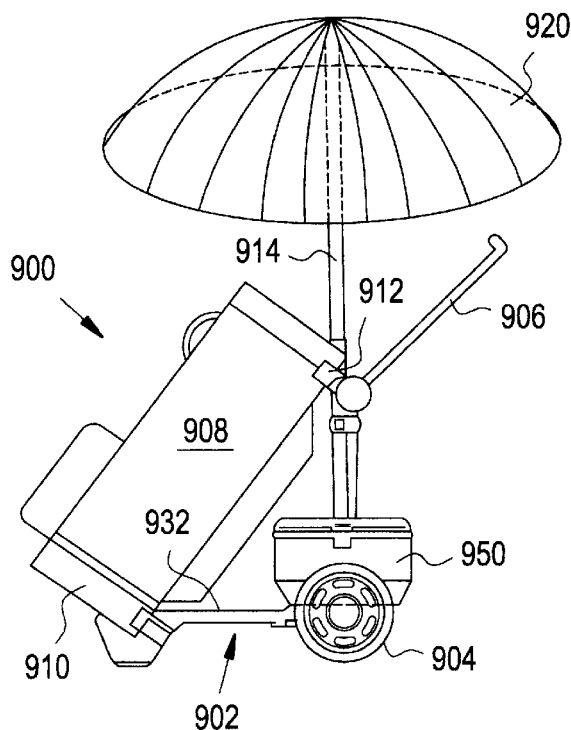
FIG. 26 is a vertical side elevation view of still another alternative embodiment of golf cart incorporating the instant invention showing a golf cart similar to that of FIGS. 1–3 equipped, according to the instant invention, with accessories such as an umbrella mount and umbrella and a container/cooler seat.
Figure 27:
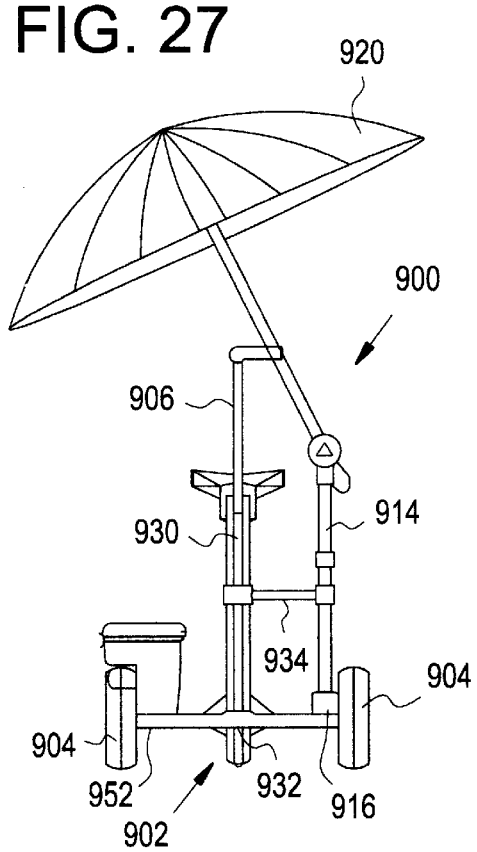
FIG. 27 is an end elevation view of the golf cart of FIG. 26.

Golf cart 900 of FIGS. 26–28 is similar to the previously described golf carts in that it includes a collapsible and extendable frame member 902 with a pair of wheels 904 and a handle 906 all arranged to carry a golf bag (FIG. 26) disposed on a front rest 910 and an upper cradle 912. An extension post 914 similar to extension post 470 of FIG. 12 and similarly mounted on top of a wheel mount 916 (FIG. 27) extends up from wheel mount 916 to support and mount an umbrella 920 (FIGS. 26–29). Another extension post 930 may be similarly mounted to extend up from second frame member 932 and a brace 934 extends therebetween to further support umbrella 920. A cooler or other compartment 950 is supported on a wheel mount 952 opposite to that which support umbrella post 914.

Figure 30:
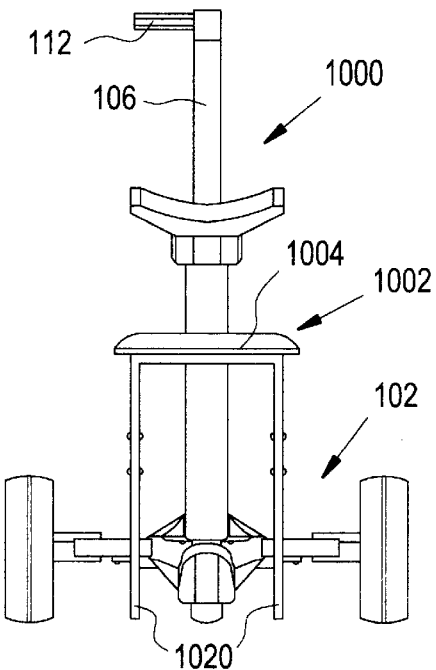
FIG. 30 is an end view of the golf cart of FIG. 29.
Figure 29:
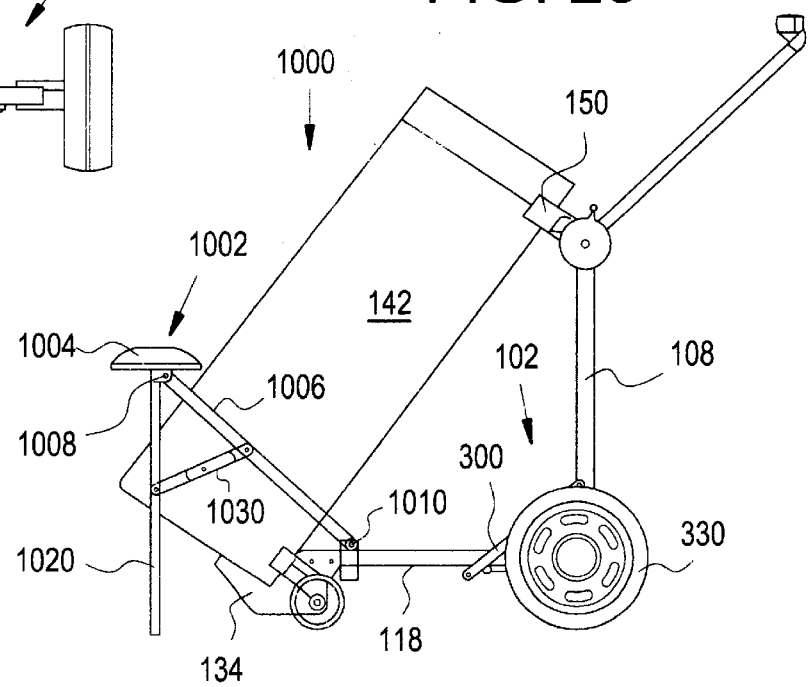
FIG. 29 is a vertical side elevation view of yet still another alternative embodiment of golf cart incorporating the instant invention showing a golf cart, for example, similar to that of FIGS. 1–3 equipped, according to the instant invention, with a seat.
Figure 31:
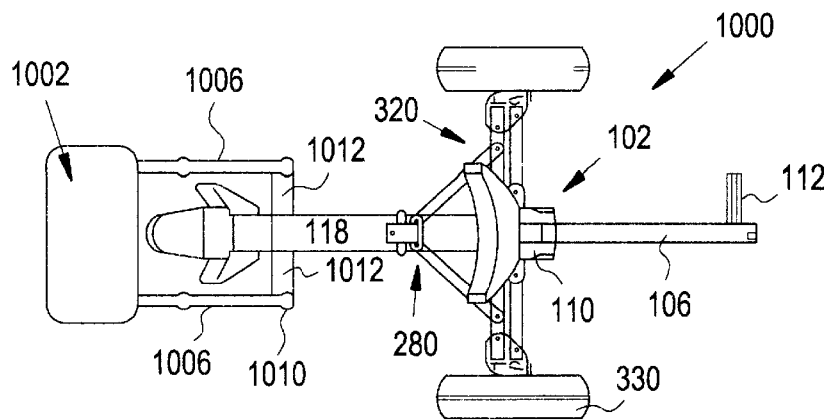
FIG. 31 is a top plan view of the golf cart of FIGS. 29 and 30.

FIGS. 29–33 show a golf cart 1000 identical in construction, operation and use to golf cart 100 (FIGS. 1–10) but which mounts a high seat assembly 1002 shown in its upright disposition in FIGS. 29–31 and in its collapsed disposition in FIGS. 32 and 33. Thus, cart 1000 includes a collapsible frame assembly 102 with frame members 108, 118 as well as a handle 106, handle grip 112 and a handle latch mechanism 110. A set of side support mechanisms 320 mount wheel mounts 332 and wheels 330 and are operated by operating device 300 upon movement of frame members 108 and 118 towards and away from each other all as described above for cart 100 (FIGS. 1–10).

Seat assembly 1002 includes a seat portion 1004 beneath which are pivotally disposed a first pair of spaced legs 1006 pivotally connected beneath seat portion 1004 at 1008 and pivotally connected at 1010 to arms 1012 that are secured to and extend out from frame member 118. A second pair of spaced legs 1020 extend down from beneath seat 1004 and are sized to reach the ground when seat assembly 1002 is fully set up as in FIGS. 29–31. A linkage set 1030 connects each set of legs 1006 to legs 1020. Thus, after cart 1000 has been collapsed from its erected disposition as shown in FIGS. 29–31 to its collapsed disposition as shown in FIGS. 32 and 33 linkage sets 1030 are also collapsed so that legs 1020 are disposed proximate legs 1006 (FIGS. 32) and then seat assembly 1002 is rotated from its standing up disposition (in phantom) to its collapsed disposition. Erection of seat assembly 1002 is accomplished in the opposite manner.

Figure 34:
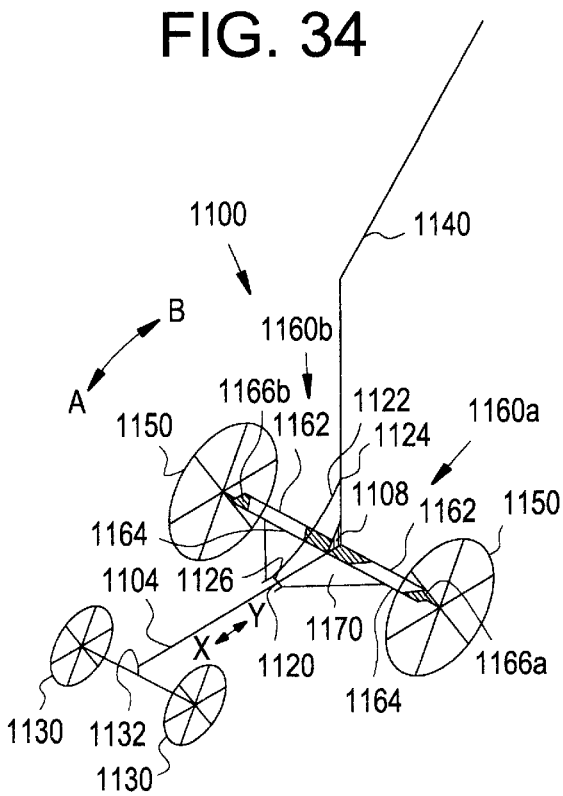
FIG. 34 is a schematic of yet still another alternative embodiment of golf cart incorporating the instant invention schematically showing a leg support and operating arrangement therefor similar to that shown for the golf carts of FIGS. 1–3, 13–16; and 29–33.

The schematic of FIG. 34 depicts a golf cart 1100 with a frame assembly 1102 similar in construction and operation to the previously described frame assemblies (of carts 100, 500, 700 and 1000) in that it includes a first frame member 1104 and a second frame member 1106 pivotally connected together at a main joint 1108 that permits frame member 1106 to pivot about joint 1108 towards and away from frame member 1104 in the directions of arrow "A" and "B" (or alternatively stated that permits frame members 1106 and 1104 to pivot towards and away from each other about main joint 1108). Frame member 1104 is a hollow rod of rectangular cross section like frame member 118 (FIG. 1) within which a slide set 1120 (similar to slide set 280) is moved in the directions of arrows "X" and "Y" due to the pivotal action of frame member 1106 about joint 1108 and the connection of slide set 1120 to frame member 1106 through an operating device 1122 constructed as a single strap pivotally connected to frame member 1106 at 1124 and to slide set 1120 at 1126. Operating device 1122 is connected to frame member 1106 and to slide set 1120 in the same manner as the operating devices and straps described above for the previously described embodiments and operates in the same manner except that there is only a single strap instead of two as described above.

Cart 1100 is provided with a set of forward wheels 1130 carried by a forward rest or support 1132 which is, in turn carried at a forward end of frame member 1104; which wheels 1130 may or may not be provided with hand brakes as described with reference to previously described embodiments. Frame member 1106, in turn, pivotally carries a handle 1140 which is connected thereto through a latch mechanism of the type described above with reference to previously described embodiments for nesting into frame member 1106.

A pair of support wheels 1150 are each carried by a side support mechanism 1160a, 1160b of the type and operation, but not necessarily the identical construction as side support mechanisms described above in conjunction with previously described embodiments. A pair of horizontally parallel side support bars 1162, 1164 extend out from each side of and are pivotally connected to main joint 1108 and each pair of side support bars 1162, 1164 are at their respective other ends pivotally connected to a wheel mount 1166a, 1166b respectively in the manner described for side support mechanisms 320 described above for golf cart 100. Connection straps 1170 are each pivotally connected to slide set 1120 and to support bars 1164 (also as described with reference to side support mechanism 320 of cart 100) and function to operate side support mechanisms 1160a, 1160b in the same manner that connection straps 344 operate side support mechanisms 320 of cart 100.

Golf cart 1100, similar to the golf cart embodiments described hereinabove, supports a golf bag (not shown) at forward rest 1132 and at a similar rest disposed proximate the junction of frame member 1106 and handle 1140.

Figure 35:
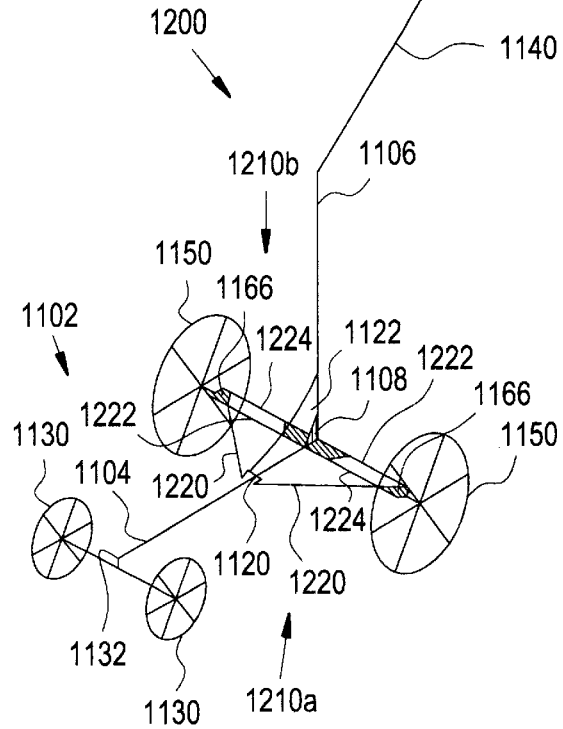
FIG. 35 is a schematic of a golf cart similar to the schematic of FIG. 34 schematically showing yet another alternative embodiment of leg support and operating arrangement therefore incorporating the instant invention.

In the schematic of FIG. 35 a golf cart 1200 is depicted with a frame assembly 1102, frame members 1104, 1106, a handle 1140, wheels 1130 and 1150 a slide set 1120 and operating device 1122 all as described with reference to the FIG. 34 embodiment. Side support mechanisms 1210a, 1210b are carried by frame members 1104, 1106 to be operated thereby and by operating device 1122 and slide set 1120 also as described with reference to the embodiment of FIG. 34: except that connection straps 1220 extend between and pivotally interconnect slide set 1120 to wheel mounts 1166a, 1166b respectively (and not to a support bar 1164 as described with reference to the embodiment of FIG. 34). Horizontally parallel side support bars 1222, 1224 are pivotally connected to main joint 1108 and to wheel mounts 1166a, 1166b as described with reference to the embodiment of FIG. 34.

Golf cart 1200 is extended and collapsed in the same way that the golf carts of the previously described embodiments are extended and collapsed; and supports a golf bag in the same manner as do said previously described carts.

Figure 36:
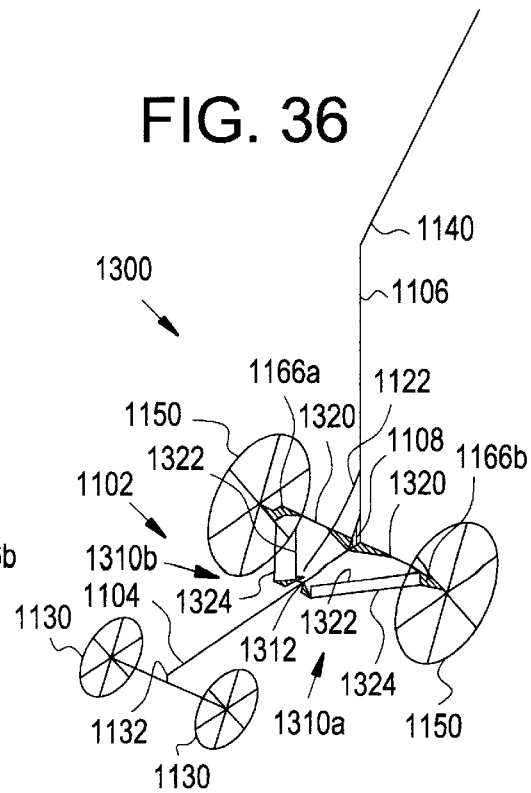

In the schematic of FIG. 36 a golf cart 1300 is depicted with a frame assembly 1102, frame members 1104, 1106 a handle 1140, wheels 1130 and 1150 and an operating device 1122; all of which are constructed, and which operate, as described hereinabove with reference to the FIGS. 34 and 35 embodiments. Side support mechanisms 1310a, 1310b are carried by frame members 1104, 1106 to be operated thereby and by operating device 1122 and a modified slide set 1312 which is different in construction then but operates as described with reference to slide set 1120 of the embodiments of FIGS. 34 and 35, except that: connection straps 1320 extend between and pivotally interconnect wheel mounts 1166a and 1166b and main joint 1108 (and not slide set 1120 and wheel mounts 1166a and 1166b as described for carts 1100 and 1200); horizontally parallel side support bars 1322, 1324 are pivotally connected to wheel mounts 1166a, 1166b and to slide set 1312 (and not main joint 1108 and wheel mounts 1166a, 1166b as described with reference to FIGS. 34 and 35); and slide set 1312 is constructed similar to slide set 704 (of cart 700 of FIGS. 17–21) with a mounting device and spaced arms (similar to mounting device 710 and arms 712 of cart 700) to pivotally receive respective ends of the horizontally aligned pairs of support bars 1322 and 1324. Main joint 1108 and wheel mounts 1166a, 1166b may be constructed and operated like main joint 1108 and wheel mounts 1166a, 1166b of FIGS. 34 and 35 or they may be modified to accept and operate the single connection straps 1320 and horizontally parallel support bars 1322, 1324. In the later construction wheel mount 1166a and 1166b would be switched so that wheel mount 1166a operates with side support mechanism 1310b and wheel mount 1166b operates with side support mechanism 1310a.

Golf cart 1300 is extended and collapsed in the same way that the golf carts of the previously described embodiments are extended and collapsed; and supports a golf bag in the same manner as do said previously described carts.

Figure 37:
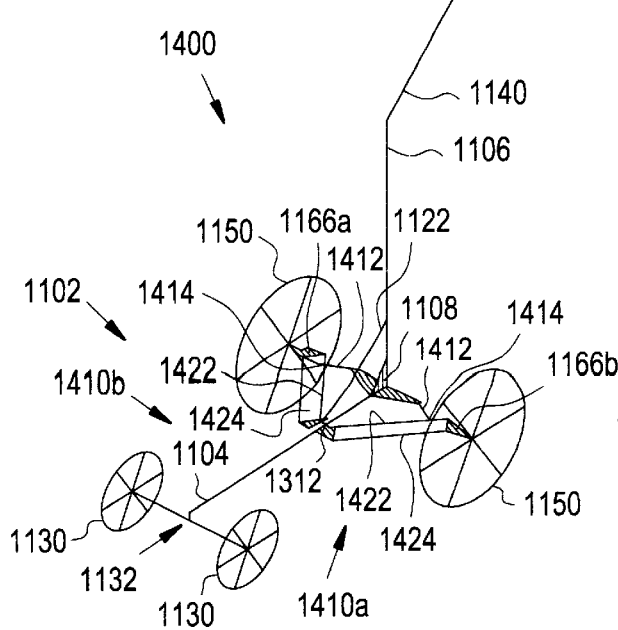

In the schematic of FIG. 37 a golf cart 1400 is depicted with a frame assembly 1102, frame members 1104, 1106 a handle 1140, wheels 1130 and 1150 and an operating device 1122; all of which are constructed, and which operate, as described hereinabove with reference to the FIGS. 34–36 embodiments. Side support mechanisms 1410a, 1410b are carried by frame members 1104, 1106 to be operated thereby and by operating device 1122 and slide set 1312 which is constructed like and operates as described with reference to slide set 1312 of the embodiment of FIG. 36, except that: connection straps 1412 extend between and pivotally interconnect main joint 1108 and each of a pair of support bars 1422 (and not wheel mounts 1166a and 1166b as described with reference to cart 1300 of FIG. 36); and each support bar 1422 is horizontally aligned with a support bar 1424 and both sets of support bars 1422, 1424 are pivotally connected to slide set 1312 and wheel mounts 1166a and 1166b in the same manner as support bars 1322 and 1324 are connected to slide set 1312 and wheel mounts 1166a and 1166b for cart 1300 (FIG. 36). Main joint 1108 and wheel mounts 1166a, 1166b may be constructed and operate as described for main joint 1108 and wheel mounts 1166a, 1166b of FIG. 36.

Golf cart 1400 is extended and collapsed in the same way that the golf carts of the previously described embodiments are extended and collapsed; and supports a golf bag in the same manner as do said previously described carts.

Figure 38:
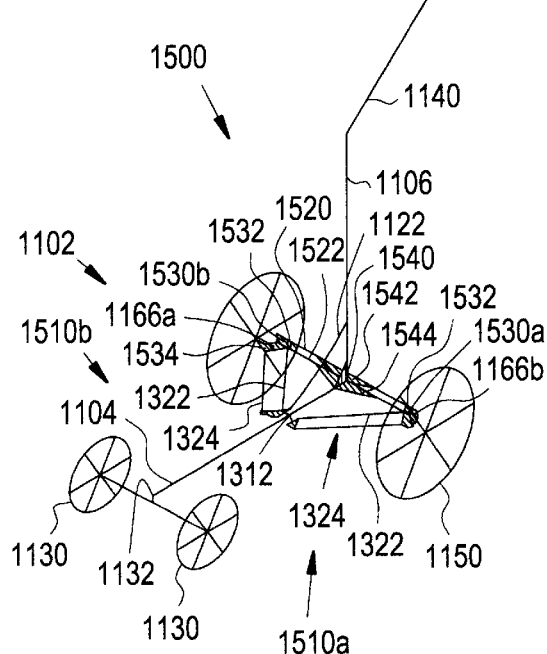

In the schematic of FIG. 38 a golf cart 1500 is depicted with a frame assembly 1102, frame members 1104, 1106 a handle 1140, wheels 1130 and 1150 and an operating device 1122; all of which are constructed, and which operate, as described hereinabove with reference to the FIGS. 34–37 embodiments. Side support mechanisms 1510a and 1510b are carried by frame members 1104, 1106 to be operated thereby and by operating device 1122 and slide set 1312 which is constructed like and operates as described with reference to slide set 1312 of the embodiment of FIGS. 36 and 37; except that a pair of connection straps 1520, 1522 are mounted in vertical alignment and so as to extend between and pivotally interconnect modified wheel mounts 1530a and 1530b and a modified main joint 1540. Horizontally aligned and parallel side support bars 1322, 1324 are also pivotally connected to modified wheel mounts 1530a and 1530b and to slide set 1312 (as described with reference to support bars 1322 and 1324 and their connections to wheel mounts 1166a, 1166b and slide set 1312 of FIGS. 36 and 37). Main joint 1540 and wheel mounts 1530a, 1530b have been modified by being constructed with spaced arms 1532, 1534 (for wheel mounts 1530a, 1530b) and 1542, 1544 (for main joint 1540) to pivotally receive and mount vertically aligned connection straps 1520, 1522.

Golf cart 1500 is extended and collapsed in the same way that the golf carts of the previously described embodiments are extended and collapsed; and supports a golf bag in the same manner as do said previously described carts.

Figure 39:
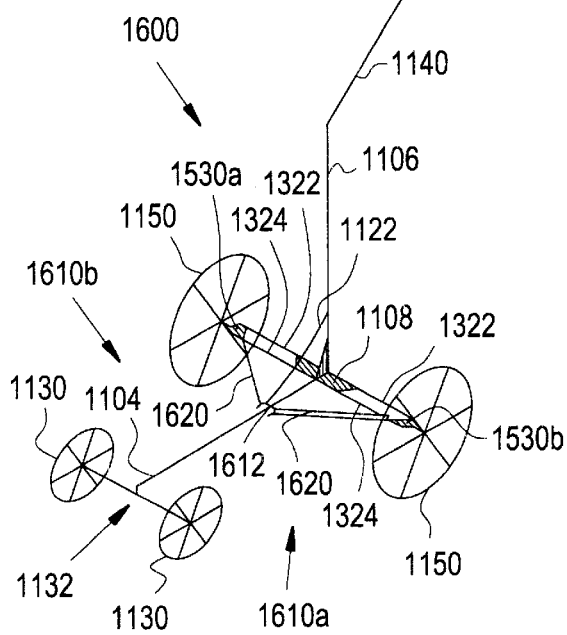

In the schematic of FIG. 39 a golf cart 1600 is depicted with a frame assembly 1102, frame members 1104, 1106 a handle 1140, wheels 1130 and 1150 and an operating device 1122; all of which are constructed, and which operate, as described hereinabove with reference to the FIGS. 34–38 embodiments. Side support mechanisms 1610a, 1610b are carried by frame members 1104, 1106 to be operated thereby and by operating device 1122 and a further modified slide set 1612 which operates as described with reference to slide sets 1120 and 1312 of the embodiments of FIGS. 34–38; except that a pair of vertically aligned connection straps 1620 extend between and pivotally interconnect modified wheel mounts 1530a, 1530b and slide set 1612. Wheel mounts 1530a and 1530b are reversed with reference to their disposition in FIG. 38 so that mount 1530a is associated with support 1610b and mount 1530b is associated with support 1610a in order to accommodate vertically aligned bars 1620. Slide set 1612, however, is constructed with a mounting device and spaced arms to pivotally receive in vertical aligned relationship respective ends of connection straps 1620. Horizontally parallel side support bars 1322, 1324 are pivotally connected to wheel mounts 1530a, 1530b and to main joint 1108 and are constructed and operate as described with reference to bars 1222, 1224 of FIG. 35.

The side support bars of the FIGS. 34–39 embodiments may also be arranged to be vertically aligned (instead of horizontally parallel) as shown with respect to the vertically aligned connection straps of FIGS. 38 and 39; with the wheel mounts, slide sets and main joints modified as needed to accommodate the vertically aligned bars.

Golf cart 1600 is extended and collapsed in the same way that the golf carts of the previously described embodiments are extended and collapsed; and supports a golf bag in the same manner as do said previously described carts.

Figure 40:
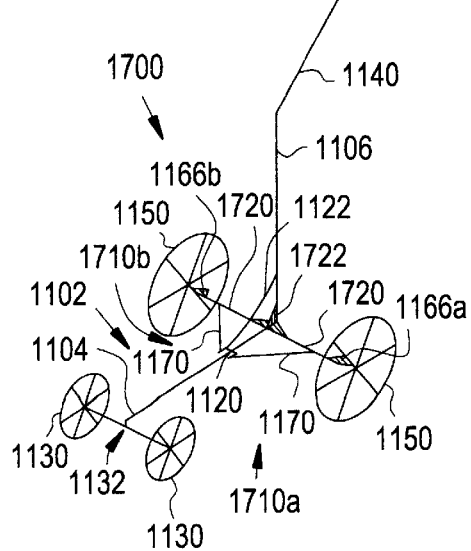

In the schematic of FIG. 40 a golf cart 1700 is depicted with a frame assembly 1102, frame members 1104, 1106, a handle 1140, wheels 1130 and 1150 and an operating device 1122; all of which are constructed, and which operate, as described hereinabove with reference to the FIGS. 34–39 embodiments. Side support mechanisms 1710a, 1710b are carried by frame members 1104, 1106 to be operated thereby and by operating device 1122 and a slide set 1120 which is constructed the same as and operates as described with reference to slide set 1120 of the embodiments of FIGS. 34 and 35. Each such support mechanism 1710a, 1710b includes a single connection strap 1170 that extends between and pivotally interconnects slide set 1120 to a single support bar 1720 that, in turn, is pivotally connected to a further modified main joint 1722 and wheel mount 1166a and 1166b (main joint 1722 and wheel mounts 1166a, 1166b may be constructed the same as main joint 1108 and wheel mounts 1166a, 1166b of the embodiments of FIGS. 34 and 35 and operate as those main joints and wheel mounts do). Single side support bars 1720 are pivotally connected to wheel mounts 1166a, 1166b and to main joint 1722 and are constructed and operate as described with reference to bars 1164 of FIG. 34. While side support bars 1720 may be constructed similar to side support bars 1124 they may be otherwise constructed; and while wheel mounts 1166a, 1166b and main joint 1108 of FIG. 34 may be utilized they may also be modified to accommodate a single side support bar.

Golf cart 1700 is extended and collapsed in the same way that the golf carts of the previously described embodiments are extended and collapsed; and supports a golf bag in the same manner as do said previously described carts.

Figure 41:
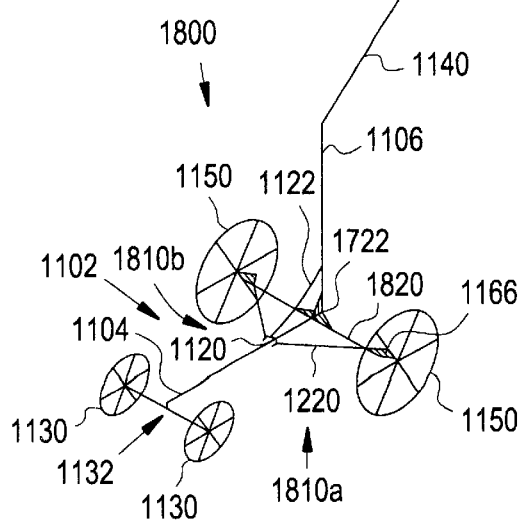

In the schematic of FIG. 41 a golf cart 1800 is depicted with a frame assembly 1102, frame members 1104, 1106, a handle 1140, wheels 1130 and 1150 and an operating device 1122; all of which are constructed, and which operate, as described hereinabove with reference to the FIGS. 34–40 embodiments. Side support mechanisms 1810a, 1810b are carried by frame members 1104, 1106 to be operated thereby and by operating device 1122 and a slide set 1120 as described with reference the embodiment of FIG. 40; except that connection straps 1220 extend between and pivotally interconnects slide set 1120 and wheel mounts 1166a, 1166b (and not slide set 1120 and a support bar as described for cart 1700). Side support bars 1820 are pivotally connected to wheel mounts 1166a, 1166b and to main joint 1722; all of which are constructed and operate as above described with reference to bars 1720, wheel mounts 1166a, 1166b and main joint 1722 of FIG. 40.

Golf cart 1800 is extended and collapsed in the same way that the golf carts of the previously described embodiments are extended and collapsed; and supports a golf bag in the same manner as do said previously described carts.

Figure 42:
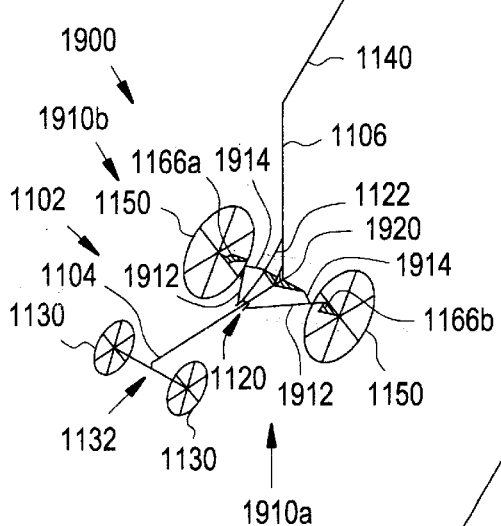

In the schematic of FIG. 42 a golf cart 1900 is depicted with a frame assembly 1102, frame members 1104, 1106, a handle 1140, wheels 1130 and 1150 and an operating device 1122; all of which are constructed, and which operate, as described hereinabove with reference to the FIGS. 34–41 embodiments. Side support mechanisms 1910a, 1910b are carried by frame members 1104, 1106 to be operated thereby and by operating device 1122 and a slide set 1120 as described with reference to the embodiments of FIGS. 40 and 41; except that each side support mechanism 1910a, 1910b includes a single support bar 1912 that extends between and pivotally interconnects its respective wheel mount 1166b, 1166a respectively to slide set 1120 and a single connection strap 1914 that extends between and pivotally interconnects its respective support bar 1912 to a modified main joint 1920. Wheel mounts 1166a, 1166b may be constructed the same as wheel mounts 1166a, 1166b of FIGS. 40 and 41 but reversed as to side supports 1910b, 1910a respectively or they may be further modified to accept the single side support bars 1912 and to be connected to connection straps 1914 as shown in FIG. 42.

Golf cart 1900 is extended and collapsed in the same way that the golf carts of the previously described embodiments are extended and collapsed; and supports a golf bag in the same manner as do said previously described carts.

Figure 43:
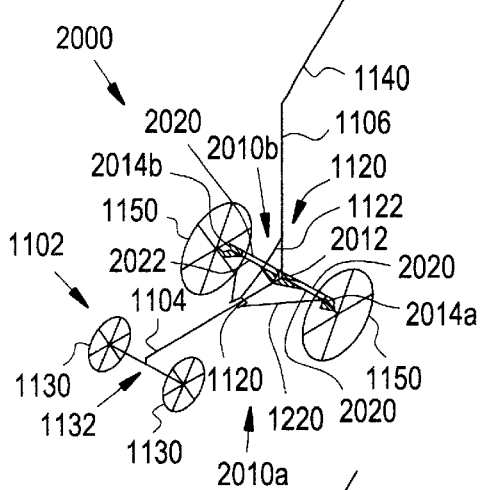

In the schematic of FIG. 43 a golf cart 2000 is depicted with a frame assembly 1102, frame members 1104, 1106, a handle 1140, wheels 1130 and 1150 and an operating device 1122; all of which are constructed, and which operate, as described hereinabove with reference to the FIGS. 34–42 embodiments. Side support mechanisms 2010a, 2010b are carried by frame members 1104, 1106 to be operated thereby and by operating device 1122 and to coact with a modified main joint 2012 and with modified wheel mounts 2014a, 2014b which are constructed and which operate as described with reference to the main joint 1540 and wheel mounts 1530a, 1530b of the embodiment of FIG. 38. A pair of vertically aligned connection straps 2020, extend between and pivotally interconnect modified wheel mounts 2014a, 2014b and modified main joint 2012. A support bar 1220 pivotally connects each wheel mount 2014a, 2014b to slide set 1120 corresponding to slide set 1120 of FIG. 34, to be operated thereby as explained above.

Golf cart 2000 is extended and collapsed in the same way that the golf carts of the previously described embodiments are extended and collapsed; and supports a golf bag in the same manner as do said previously described carts.

Figure 44:
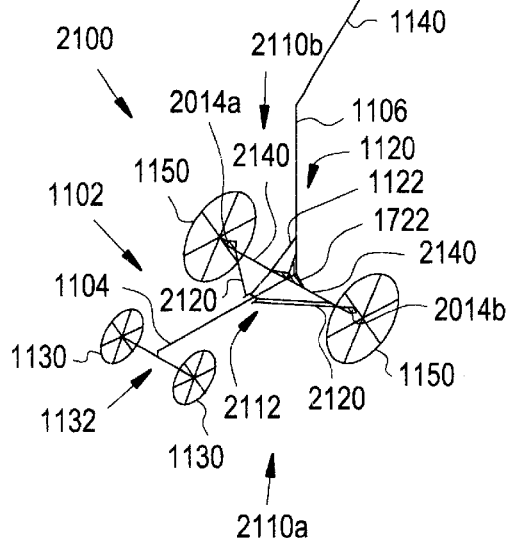

In the schematic of FIG. 44 a golf cart 2100 is depicted with a frame assembly 1102, frame member 1104, 1106, a handle 1140 wheels 1130 and 1150 and an operating device 1122; all of which are constructed, and which operate as described hereinabove with reference to the FIGS. 34–41 embodiments. Side support mechanisms 2110a, 2110b are carried by frame members 1104, 1106 to be operated thereby and by operating device 1122 and to coact with a modified slide set 2112 and modified wheel mounts 2014b, 2014a which are constructed and which operate as described with reference to slide set 1612 and wheel mounts 1530a, 1530b of the embodiment of FIG. 39 but are structurally different therefrom.

Wheel mounts 2014a, 2014b are constructed like wheel mounts 2014a, 2014b of FIG. 43 but are reversed in disposition so that mount 2014a coacts with support 2110b and so that mount 2014b coacts with support 2110a all so as to accommodate vertically aligned bars 2120, 2122. A pair of vertically aligned connection straps 2120, extend between and pivotally interconnect modified slide set 2132 and modified wheel mounts 2014a, 2014b (slide set 2132 and wheel mounts 2014a, 2014b have been modified the same as slide set 1612 and wheel mounts 1530a, 1530b of FIG. 39 to accept and pivotally carry vertically aligned connection straps 2120). Single support bars 2140 are each pivotally connected to main joint 1722, corresponding to joint 1722 of FIGS. 40 and 41 and wheel joints 2014b, 2014a.

Golf cart 2100 is extended and collapsed in the same way that golf carts of the previously described embodiments are extended and collapsed; and supports a golf bag in the same manner as do said previously described carts.

Figure 45:
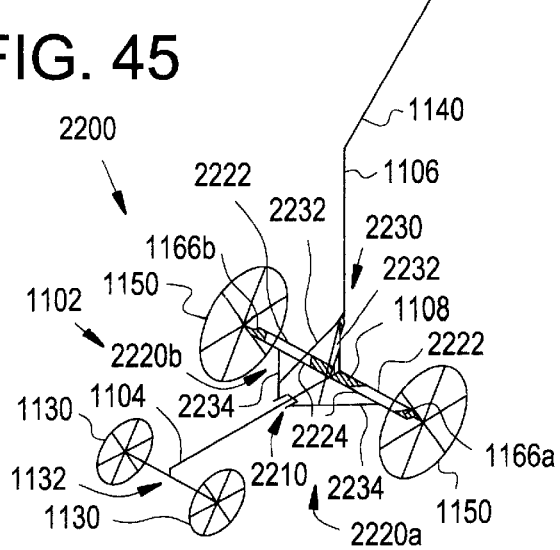

In the schematic of FIG. 45 a golf cart 2200 is depicted with a frame assembly 1102, frame members 1104, 1106, a handle 1140, wheels 1130 and 1150, main joint 1108 and wheel mounts 1166a, 1166b all of which are constructed, and which operate as described hereinabove with reference to the FIG. 34 embodiment. A modified slide set 2210 and modified side support mechanisms 2220a, 2220b are provided for golf cart 2200 to coact with a modified side support mechanism operating device 2230 which includes a pair of operating straps 2232 one end of each of which is pivotally connected to frame member 1106 and the other end of each of which is pivotally connected to a connection strap 2234 of each such side support mechanism 2220a, 2220b.

Slide set 2210 may be constructed and will operate like slide set 1120 of cart 1100 (FIG. 34) but may, if desired, be constructed without a pivotal connection for operating strap (s) since such are not connected to slide set 2210. Except for the pivotal connection of the pair of operating straps 2232 to respective connection straps 2234 for mechanisms 2220a, 2220b side support mechanisms 2220a, 2220b are constructed identical to and operate identically to side support mechanisms 1160a, 1160b of cart 1100 (FIG. 34) in that mechanisms 2220a, 2220b each include a pair of horizontally aligned side support bars 2222 and 2224 which are pivotally connected to and extend between main joint 1108 and wheel mounts 1166a, 1166b and a connection strap 2234 that extends between and pivotally connects slide set 2210 and support bar 2224.

Golf cart 2200 is extended and collapsed in the same way that the golf carts of the previously described embodiments are extended and collapsed; and supports a golf bag in the same manner as do said previously described carts.

Figure 46:
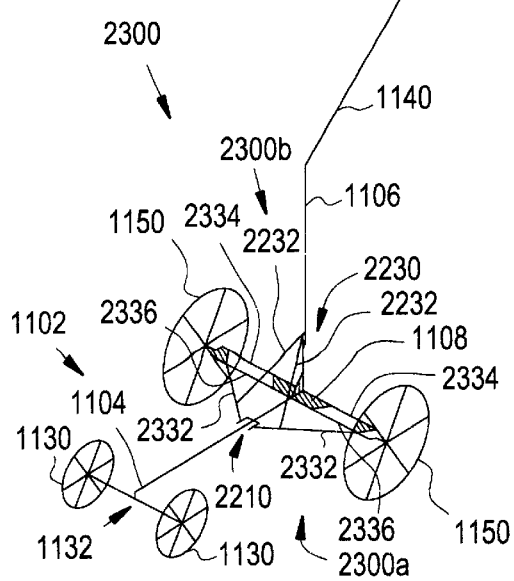

In the schematic of FIG. 46 a golf cart 2300 is depicted with a frame assembly 1102, frame members 1104, 1106, a handle 1140, wheels 1130 and 1150, main joint 1108 and wheel mounts 1166a, 1166b all of which are constructed, and which operate as described hereinabove with reference to the FIG. 35 embodiment. Modified slide set 2210 (FIGS. 45 and 46) and modified side support mechanisms 2300a, 2300b (FIG. 46) are provided for golf cart 2300 (FIG. 46) to coact with modified side support mechanisms operating device 2230 (FIGS. 45 and 46) which includes a pair of operating straps 2232 one end of each of which is pivotally connected to frame member 1106 and the other end of each of which is pivotally connected to a connection strap 2332 of each such side support mechanism 2300a, 2300b. Except for the pivotal connection of the pair of operating straps 2232 each to a connection strap 2332 side support mechanisms 2300a, 2300b are constructed identical to and operate identically to side support mechanisms 1210a, 1210b of cart 1200 (FIG. 35) in that mechanisms 2300a, 2300b each include a pair of horizontally aligned side support bars 2334 and 2336 which are pivotally connected to and extend between main joint 1108 and wheel mounts 1166a, 1166b and a connection strap 2332 that extends between and pivotally connects slide set 2210 and support bar 2334.

Golf cart 2300 is extended and collapsed in the same way that the golf carts of the previously described embodiments are extended and collapsed; and supports a golf bag in the same manner as do said previously described carts.

In the schematic of FIG. 47 a golf cart 2400 is depicted with a frame assembly 1102, frame members 1104, 1106, a handle 1140, wheels 1130 and 1150, main joint 1108 and wheel mounts 1166a, 1166b all of which are constructed, and which operate as described hereinabove with reference to the FIG. 36 embodiment. A modified slide set 2410 and modified side support mechanisms 2420a, 2420b are provided for golf cart 2400 to coact with a modified side support mechanisms operating device 2430 which includes a pair of operating straps 2432 one end of each of which is pivotally connected to frame member 1106 and the other end of each of which is pivotally connected to a side support bar 2422 of each such side support mechanism 2420a, 2420b.

Slide set 2410 may be constructed and will operate like slide set 1312 of cart 1300 (FIG. 37) but may, if desired, be constructed without pivotal connections for operating strap (s) since such are not connected to slide set 2410. Except for the pivotal connection of the pair of operating straps 2432 each to a support bar 2422 side support mechanisms 2420a, 2420b are constructed identical to and operate identically to side support mechanisms 1310 of cart 1300 (FIG. 36) in that mechanisms 2420a, 2420b each include a pair of horizontally aligned side support bars 2422 and 2424 which are pivotally connected to and extend between slide set 2410 and wheel mounts 1166a, 1166b and a connection strap 2436 which is pivotally connected to and extends between main joint 1108 and wheel mounts 1166a, 1166b.

Golf cart 2400 is extended and collapsed in the same way that the golf carts of the previously described embodiments are extended and collapsed; and supports a golf bag in the same manner as do said previously described carts.

In the schematic of FIG. 48 a golf cart 2500 is depicted with a frame assembly 1102, frame members 1104, 1106, a handle 1140, wheels 1130 and 1150, main joint 1108 and wheel mounts 1166a, 1166b all of which are constructed, and which operate as described hereinabove with reference to the FIG. 37 embodiment. Modified slide set 2410 (FIGS. 47 and 48) and modified side support mechanisms 2520a, 2520b (FIG. 48) are provided for golf cart 2500 to coact with modified side support mechanisms operating device 2430 (FIGS. 47 and 48) which includes a pair of operating straps 2432 one end of each of which is pivotally connected to frame member 1106 and the other end of each of which is pivotally connected to a side support bar 2522 of each such side support mechanism 2520a, 2520b.

Slide set 2410 may be constructed and will operate like slide set 2410 of cart 2400 (FIG. 47). Except for the pivotal connection of the pair of operating straps 2432 each to a support bar 2522 side support mechanisms 2520a, 2520b are constructed identical to and operate identically to side support mechanisms 1410 of cart 1400 (FIG. 37) in that mechanisms 2520a, 2520b each include a pair of horizontally aligned side support bars 2522 and 2524 which are pivotally connected to and extend between slide set 2410 and wheel mounts 1166a, 1166b and a connection strap 2536 which is pivotally connected to and extends between main joint 1108 and side support bar 2522.

Golf cart 2500 is extended and collapsed in the same way that the golf carts of the previously described embodiments are extended and collapsed; and supports a golf bag in the same manner as do said previously described carts.

In the schematic of FIG. 49 a golf cart 2600 is depicted with a frame assembly 1102, frame members 1104, 1106, a handle 1140, wheels 1130 and 1150, main joint 1540 and wheel mounts 1530a, 1530b all of which are constructed, and which operate as described hereinabove with reference to the FIG. 38 embodiment. Modified slide set 2410 (FIGS. 47, 48 and 49) and modified side support mechanisms 2610a, 2610b (FIG. 49) are provided for golf cart 2600 to coact with modified side support mechanisms operating device 2430 (FIGS. 47, 48 and 49) which includes a pair of operating straps 2432 one end of each of which is pivotally connected to frame member 1106 and the other end of each of which is pivotally connected to a side support bar 2422 (FIGS. 47 and 49) of each such side support mechanism 2610a, 2610b (FIG. 49). Except for the pivotal connection of the pair of operating straps 2432 each to a support bar 2422 side support mechanisms 2520a, 2520b are constructed identical to operate and operate identically to side support mechanisms 1510a, 1510b of cart 1500 (FIG. 38) in that mechanisms 2610a, 2610b each include a pair of horizontally aligned side support bars 2422, 2424 which are pivotally connected to and extend between slide set 2410 and wheel mounts 1530a, 1530b and a pair of vertically aligned connection straps 2640 that extend between main joint 1540 and wheel joints 1530a, 1530b.

Golf cart 2600 is extended and collapsed in the same way that the golf carts of the previously described embodiments are extended and collapsed; and supports a golf bag in the same manner as do said previously described carts.

In the schematic of FIG. 50 a golf cart 2700 is depicted with a frame assembly 1102, frame members 1104, 1106, a handle 1140, wheels 1130 and 1150, main joint 1108 and wheel mounts 1530a, 1530b all of which are constructed, and which operate as described hereinabove with reference to the FIG. 39 embodiment. A modified slide set 2710 and modified side support mechanisms 2720a, 2720b are provided for golf cart 2700 to coact with modified side support mechanisms operating device 2430 which includes a pair of operating straps 2432 one end of each of which is pivotally connected to frame member 1106 and the other end of each of which is pivotally connected to a connection strap 2730 of a pair of vertically aligned connection straps 2730, 2732 of each such side support mechanism 2720a, 2720b. Except for the pivotal connection of the pair of operating straps 2432 to connection straps 2730 side support mechanisms 2720a, 2720b are constructed identical to and operate identically to side support mechanisms 1610a, 1610b of cart 1600 (FIG. 39) in that mechanisms 2720a, 2720b each include a pair of horizontally aligned side support bars 1322, 1324 which are pivotally connected to and extend between main joint 1108 and wheel mounts 1530a, 1530b and a pair of vertically aligned connection straps 2730 that extend between main slide set 2710 and wheel mounts 1530a, 1530b.

Slide set 2710, like slide set 1612 of FIG. 39 is constructed with a mounting device and spaced arms to pivotally receive in vertical aligned relationship respective ends of connection straps 2730 but without a pivotal connection for operating strap 2432 because no such connections is required.

Golf cart 2700 is extended and collapsed in the same way that the golf carts of the previously described embodiments are extended and collapsed; and supports a golf bag in the same manner as do said previously described carts.

Figure 51:
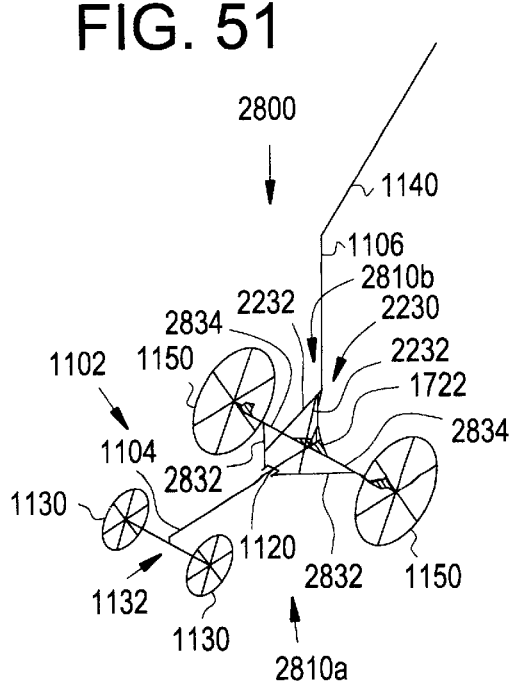

In the schematic of FIG. 51 a golf cart 2800 is depicted with a frame assembly 1102, frame members 1104, 1106, a handle 1140, wheels 1130 and 1150, main joint 1722 and wheel mounts 1166a, 1166b all of which are constructed, and which operate as described hereinabove with reference to the FIG. 40 embodiment. Slide set 1120 (FIGS. 40 and 51) and modified side support mechanisms 2810a, 2810b (FIG. 51) are provided for golf cart 2800 to coact with modified side support mechanisms operating device 2230 (FIGS. 40 and 51) which includes a pair of operating straps 2232 one end of each of which is pivotally connected to frame member 1106 and the other end of each of which is pivotally connected to a connection strap 2832 of each such side support mechanism 2810a, 2810b. Except for the pivotal connection of the pair of operating straps 2232 to connection straps 2832 side support mechanisms 2810a, 2810b are constructed identical to and operate identically to side support mechanisms 1710a, 1710b of cart 1700 (FIG. 40) in that they each include a single side support bar 2834 which is pivotally connected to and extends between main joint 1722 and wheel mounts 1166a, 1166b and a connection strap 2832 that extends between slide set 1120 and support bar 2834.

Golf cart 2800 is extended and collapsed in the same way that the golf carts of the previously described embodiments are extended and collapsed; and supports a golf bag in the same manner as do said previously described carts.

Figure 52:
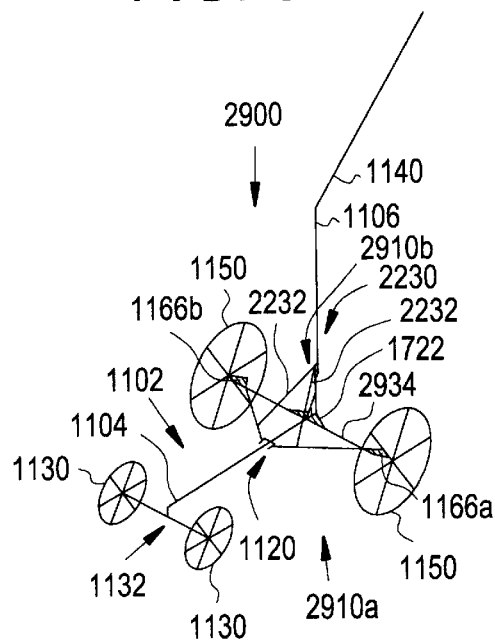

In the schematic of FIG. 52 a golf cart 2900 is depicted with a frame assembly 1102, frame members 1104, 1106, a handle 1140, wheels 1130 and 1150, main joint 1722 and wheel mounts 1166a, 1166b all of which are constructed, and which operate as described hereinabove with reference to the FIG. 41 embodiment. Slide set 1120 (FIGS. 41 and 52) and modified side support mechanisms 2910a, 2910b (FIG. 52) are provided for golf cart 2900 to coact with modified side support mechanisms operating device 2230 (FIGS. 41 and 52) which includes a pair of operating straps 2232 one end of each of which is pivotally connected to frame member 1106 and the other end of each of which is pivotally connected to a connection strap 2932 of each such side support mechanism 2910a, 2910b. Except for the pivotal connection of the pair of operating straps 2232 to connection straps 2932 side support mechanisms 2910a, 2910b are constructed identical to and operate identically to side support mechanisms 1810a, 1810b of cart 1800 (FIG. 41) in that mechanisms 2910a, 2910b each include a single side support bar 2934 which is pivotally connected to and extends between main joint 1722 and wheel mounts 1166a, 1166b and a connection strap 2932 that extends between slide set 1120 and wheel mounts 1166a, 1166b.

Golf cart 2900 is extended and collapsed in the same way that the golf carts of the previously described embodiments are extended and collapsed; and supports a golf bag in the same manner as do said previously described carts.

Figure 53:
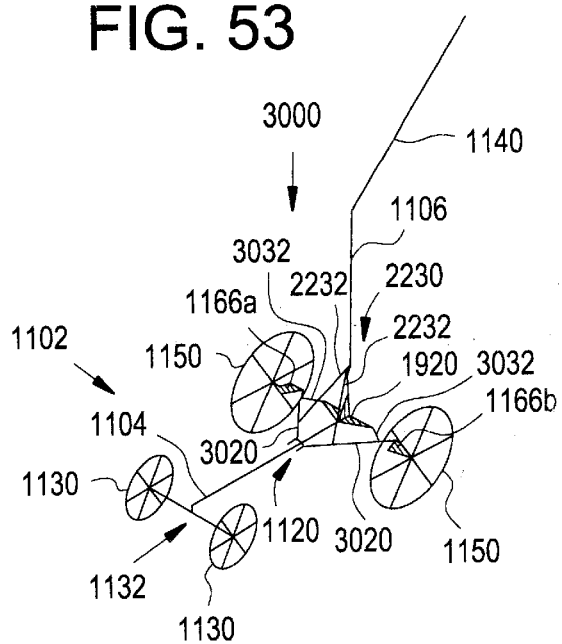

In the schematic of FIG. 53 a golf cart 3000 is depicted with a frame assembly 1102, frame members 1104, 1106, a handle 1140, wheels 1130 and 1150, main joint 1920 and wheel mounts 1166a, 1166b all of which are constructed, and which operate as described hereinabove with reference to the FIG. 42 embodiment. Slide set 1120 (FIGS. 24 and 53) and modified side support mechanisms 3010a, 3010b (FIG. 52) are provided for golf cart 3000 (FIG. 53) to coact with side support mechanisms operating device 2230 (FIGS. 52 and 53) which includes a pair of operating straps 2232 one end of each of which is pivotally connected to frame member 1106 and the other end of each of which is pivotally connected to a support bar 3020 of each such side support mechanism 3010a, 3010b. Except for the pivotal connection of the pair of operating straps 2232 to support bars 2332 side support mechanisms 3010a, 3010b are constructed identical to and operate identically to side support mechanisms 1910a, 1910b of cart 1900 (FIG. 42) in that mechanisms 3010a, 3010b each include a single side support bar 3020 which is pivotally connected to and extends between main joint 1920 and wheel mounts 1166b, 1166a and a connection strap 3032 that extends main joint 1920 and support bar 3020.

Golf cart 3000 is extended and collapsed in the same way that the golf carts of the previously described embodiments are extended and collapsed; and supports a golf bag in the same manner as do said previously described carts.

Figure 54:
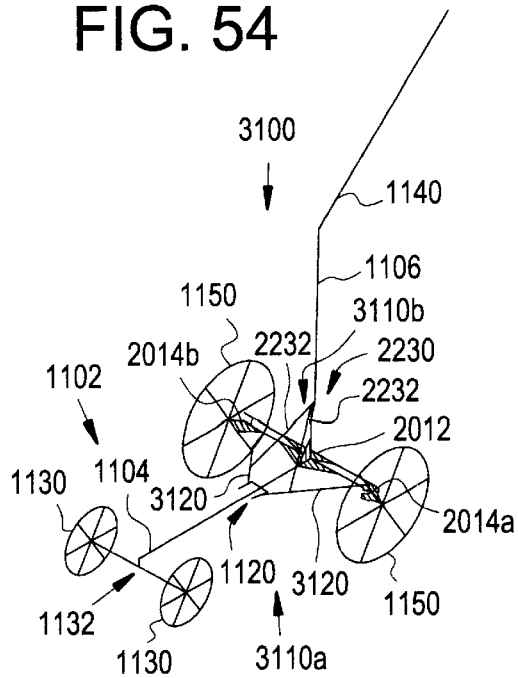

In the schematic of FIG. 54 a golf cart 3100 is depicted with a frame assembly 1102, frame members 1104, 1106, a handle 1140, wheels 1130 and 1150, main joint 2012 and wheel mounts 2014a, 2014b all of which are constructed, and which operate as described hereinabove with reference to the FIG. 43 embodiment. Slide set 1120 (FIGS. 43 and 54) and modified side support mechanisms 3110a, 3110b (FIG. 54) are provided for golf cart 3100 to coact with side support mechanisms operating device 2230 (FIGS. 53 and 54) which includes a pair of operating straps 2232 one end of each of which is pivotally connected to frame member 1106 and the other end of each of which is pivotally connected to a support bar 3120 of each such side support mechanism 3110a, 3110b. Except for the pivotal connection of the pair of operating straps 2232 to support bars 3120 side support mechanisms 3110a, 3110b are constructed identical to and operate identically to side support mechanisms 2010a, 2010b of cart 2000 (FIG. 43) in that mechanisms 3110a, 3110b each include a single side support bar 3120 which is pivotally connected to and extends between slide set 1120 and wheel mounts 2014b, 2014 and a pair of vertically aligned connection straps 2020 that extend main joint 2012 and wheel mounts 2014a, 2014b.

Golf cart 3100 is extended and collapsed in the same way that the golf carts of the previously described embodiments are extended and collapsed; and supports a golf bag in the same manner as do said previously described carts.

Figure 55:
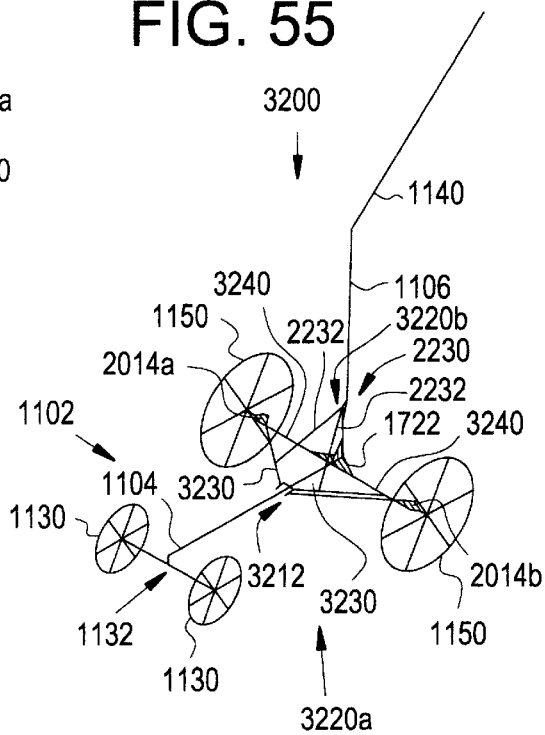

In the schematic of FIG. 55 a golf cart 3200 is depicted with a frame assembly 1102, frame members 1104, 1106, a handle 1140, wheels 1130 and 1150, main joint 1722 and wheel mounts 2014b, 2014a all of which are constructed, and which operate as described hereinabove with reference to the FIG. 44 embodiment. Modified slide set 3212 and modified side support mechanism 3220a, 3220b are provided for golf cart 3200 to coact with modified side support mechanisms operating device 2230 which includes a pair of operating straps 2232 one end of each of which is pivotally connected to frame member 1106 and the other end of each of which is pivotally connected to connection strap 3230 of each such side support mechanism 3220a, 3220b. Except for the pivotal connection of the pair of operating straps 2232 to connection straps 3230 side support mechanisms 3220a, 3220b are constructed identical to and operate identically to side support mechanisms 2110a, 2110b of cart 2110 (FIG. 44) in that mechanisms 3220a, 3220b each include a single side support bar 3240 which is pivotally connected to and extends between main joint 1722 and wheel mounts 2014b, 2014a and a pair of vertically aligned connection straps 3230 that extend between slide set 3212 and wheel mounts 2014b, 2014a.

Slide set 3212 and wheel mounts 2014b, 2014a are each constructed, as hereinabove described, to pivotally mount connection straps 3230 in vertical alignment.

Golf cart 3200 is extended and collapsed in the same way that the golf carts of the previously described embodiments are extended and collapsed; and supports a golf bag in the same manner as do said previously described carts.

Figure 56:
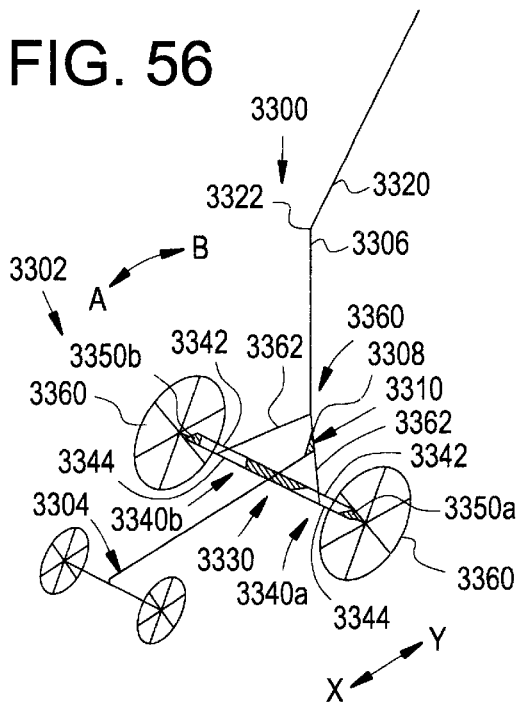
FIGS. 56 and 57 are schematics of golf carts similar to the schematics of FIGS. 34–55 each schematically showing another embodiment of frame and of leg support and operating arrangements therefore with each incorporating the instant invention.

In the schematic of FIG. 56 a golf cart 3300 is depicted with a modified frame assembly 3302 including a first frame assembly 3304, and a second frame member 3306 pivotally connected at 3308 to a modified a main joint 3310. A handle 3320 is pivotally connected to frame member 3306 through a latch mechanism at 3322 of the type described at 110 (FIGS. 4, 5 and 6) for cart 100 (FIGS. 1–10) for movement between an extended position (FIG. 56) and a collapsed position nested within a space (not shown) within frame member 3306 which is otherwise constructed and configured like frame member 1106 of the hereinabove described carts. Frame member 3304 is constructed and configured like frame members 110 of the hereinabove described carts but does not include a slide set like those carts. Instead a support device 3330 is fixedly attached to frame member 3304 forward of its main joint 3310. A pair of side support mechanisms 3340a, 3340b each pivotally support a pair of first ends of horizontally aligned support bars 3342, 3344 the other ends of which pivotally carry wheel mounts 3350a, 3350b that in turn rotatively mount wheels 3360. Wheel mounts 3350a, 3350b and wheels 3360 are constructed, configured and operate similar to the wheel mounts and wheels of the hereinabove described carts.

Cart 3300 is not equipped with connection straps [such as connection straps 344 of cart 100 (FIGS. 1–10)] but side support mechanisms 3340a and 3340b are instead pivotally connected to and operated by an operating device 3360 which includes a pair of operating straps 3362 one end of each of which are pivotally connected to frame member 3306 and the other end of which are pivotally connected to a respective support bar 3344.

Movement of frame member 3306 about joint 3310 in the direction of arrow "A" towards frame member 3304 (or of frame members 3304, 3306 towards each other) will pivot support bars 3342, 3344 about their pivots on support device 3330 in the direction of arrow "X" and move wheel mounts 3350a, 3350b and wheels 3360 towards frame member 3304 thus placing cart 3300 in its collapsed or folded disposition.

Movement of frame member 3306 about joint 3310 in the direction of arrow "B" (or of frame members 3304, 3306 away from each other) will pivot support bars 3342, 3344 about their pivots on support device 3330 in the direction of arrow "Y" and move wheel mounts 3350a, 3350b and wheels 3360 towards away from frame member 3304 placing cart 3300 in its extended or erected disposition.

Figure 57:
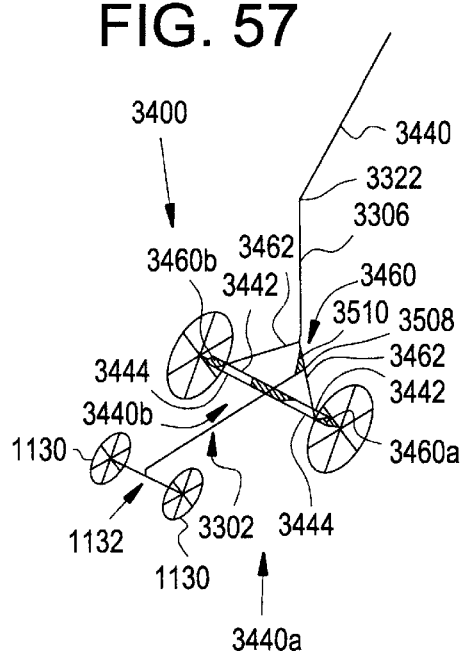

Cart 3400, of the schematic of FIG. 57 is substantially identical in construction, configuration and operation to cart 3300 of the schematic of FIG. 56; except that cart 3400 is provided with a side support mechanisms operating device 3460 with operating straps 3462 having first ends pivotally connected to frame members 3306 and second ends pivotally connected to wheel mounts 3460a, 3460b which are constructed and configured to so receive straps 3462. Support bars 3444 of side support mechanisms 3440a, 3440b do not need to pivotally receive straps 3462 as they had to for cart 3300 (FIG. 56).

Figure 58:
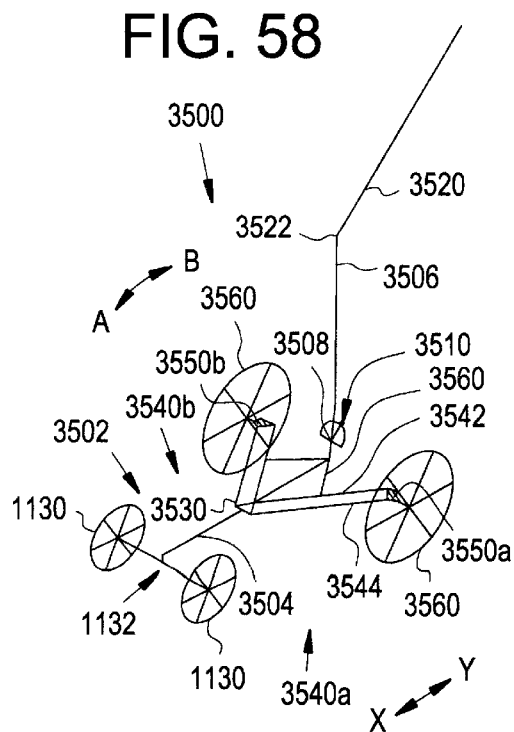

In the schematic of FIG. 58 a golf cart 3500 is depicted with a modified frame assembly 3502 including a first frame assembly 3504, and a second frame member 3506 pivotally connected at 3508 to a modified a main joint 3510. A handle 3520 is pivotally connected to frame member 3506 through a latch mechanism at 3522 of the type described at 110 (FIGS. 4, 5 and 6) for cart 100 (FIGS. 1–10) for movement between an extended position (FIG. 58) and a collapsed position nested within a space (not shown) within frame member 3506 which is otherwise constructed and configured like frame member 1106 of the hereinabove described carts. Frame member 3504 is constructed and configured like frame members 110 of the hereinabove described carts but does not include a slide set like those carts. Instead a support device 3530 is fixedly attached to frame member 3504 forward of its main joint 3510. A pair of side support mechanisms 3540a, 3540b each pivotally support a pair of first ends of horizontally aligned support bars 3542, 3544 the other ends of which pivotally carry wheel mounts 3550a, 3550b that in turn rotatively mount wheels 3560. Wheel mounts 3550a, 3550b and wheels 3560 are constructed, configured and operate similar to the wheel mounts and wheels of the hereinabove described carts.

Cart 3500 is not equipped with a side support mechanisms operating device or operating straps (such as device 3360 and straps 3362 of cart 3300—FIG. 56) but side support mechanisms 3540a and 3540b are instead each pivotally connected to and operated by a connection strap 3560 one end of each of which are pivotally connected to frame member 3506 and the other end of which is pivotally connected to a respective support bar 3542.

Frame member 3504 is somewhat elongated like frame member 3304 (FIG. 56) and mounts a support device 3530 (similar to support device 3330—FIG. 56). In addition, main joint 3510 pivotally connecting frame members 3504, 3506 is disposed above where connection straps 3560 pivotally connect to frame member 3506.

Movement of frame member 3506 about joint 3510 in the direction of arrow "A" towards frame member 3504 (or of frame members 3504, 3506 towards each other) will pivot support bars 3542, 3544 about their pivots on support device 3530 in the direction of arrow "Y" and move wheel mounts 3550a, 3550b and wheels 3560 towards frame member 3504 thus placing cart 3500 in its collapsed or folded disposition. Movement of frame member 3506 about joint 3510 in the direction of arrow "A" (or of frame members 3504, 3506 away from each other) will pivot support bars 3542, 3544 about their pivot on support device 3530 in the direction of arrow "X" and move wheel mounts 3550a, 3550b and wheels 3560 towards away from frame member 3504 placing cart 3500 in its extended or erected disposition.

Figure 59:
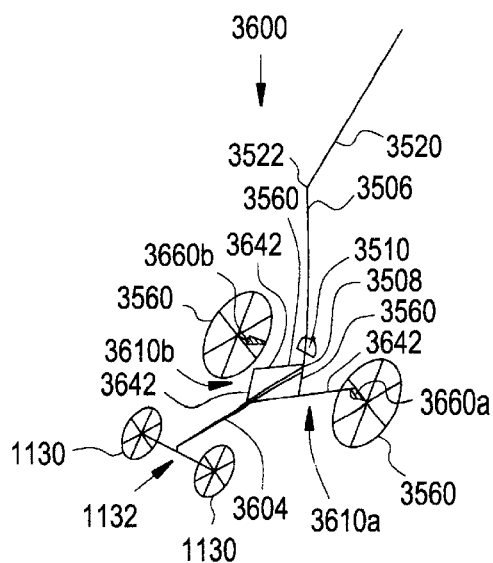
FIGS. 58 and 59 are schematics of golf carts similar to those of the schematics of FIGS. 34–57, each schematically showing yet other embodiments of frame and of leg support and operating arrangements therefore with each incorporating the instant invention.

Cart 3600, of the schematic FIG. 59 is substantially identical in construction, configuration and operation to cart 3500 of the schematic of FIG. 58; except that its side support mechanisms 3610a, 3610b are each provided with only a single side support bar 3642 each pivotally connected at one end to frame member 3604 and at their other ends to respective wheel mounts 3660a, 3660b.

Figure 60:
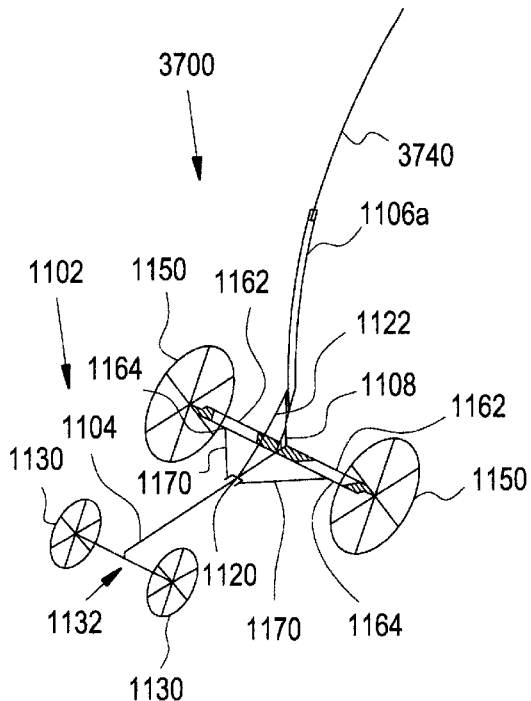
FIG. 60 is a schematic of golf cart similar to that of FIG. 32 but schematically showing an alternative collapsible handle construction usable with the golf carts of FIGS. 1–59.

Cart 3700 of the schematic of FIG. 60 is identical in construction, configuration and operation to cart 1100 of the schematic of FIG. 34 except that handle 3740 of cart 3700 slides into and is received within frame member 3706 of cart 3700.

All the carts of schematics 34–60 may have their second frame members and main joints modified so that the respective carts may mount a battery tank and other containers or tanks and so that the wheels thereof may be motorized and battery powered as shown and described above for carts 500 (FIGS. 13–16), 700 (FIGS. 17–21) and 800 (FIGS. 22–25). Such carts may also, or instead be constructed like cart 900 (FIGS. 26–28) to mount an umbrella and/or to mount a seat like that of carts 500 (FIGS. 13–16), 700 (FIGS. 17–21) and 800 (FIGS. 22–25) and/or to mount a high seat like that of cart 1000 (FIGS. 29–33).

While the hereinabove described collapsible and extensible articulation frame members have been shown and described as applied to golf cart constructions and supporting wheels they may just as well be used with and for other wheeled devices and in fact for other devices which may not have wheels but which are to be otherwise supported on the ground or a floor like structure.

It is understood that although I have shown the preferred embodiments of my invention that various modifications may be made in the details thereof without departing from the spirit as comprehended by the following claims.

What is claimed is:

1. A cart for use by golfers and the like; comprising:
   (a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article;
   (b) side support means carried by said frame assembly for movement between a first or collapsed support disposition wherein said side support means are collapsed proximate to but support said frame assembly means and a second or erected disposition wherein said side support means extend from and further support said frame assembly means;
   (c) operating means carried by and interconnecting said frame assembly means and said side support means and responsive to movement of said frame assembly means between said first frame disposition and second frame disposition to move said side support means between said first support and said second support dispositions thereof;
   (d) handle means carried by said second frame means for pivotal movement between a first or collapsed handle disposition and a second or erected handle disposition;
   (e) said second frame means being formed with a groove, said handle means nesting in said groove when said handle means are disposed in said first handle disposition; and
   (f) handle latch means interconnecting said handle means and said second frame means and settable between a latched disposition wherein said handle means is prevented from movement between said first handle disposition and said second handle disposition and an unlatched disposition wherein said handle means are permitted movement between said first handle disposition and said second handle disposition;
   (g) said latch means being canister like in configuration and including:
      (i) a pair of cup-like members carried by said second frame means in spaced relationship one member with respect to the other, said handle means carrying at an end thereof a disc-like member sized and configured to be disposed in said space between said cup-like members;
      (ii) at least one of said cup-like members and said disc-like member each having holes formed therein about hole circles of equal diameter and which are concentric when said disc-like member is disposed between said cup-like members;
      (iii) a latch member carried by said disc-like member which has holes formed therein, said latch member including a plurality of projections arranged thereon in a projection circle concentric with and of the same size as said hole circles and such that said projections may extend through said holes in said cup-like member of said handle means; and
      (iv) latch operation means carried by said latch means for coaction with said latch member to move said latch member between a latching disposition wherein said projections extend into said holes in said disc-like member and a release disposition wherein said projections are prevented from entering said holes in said disc-like member.

2. A cart for use by golfers and the like; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to coact to receive, position and carry an article and wherein in said second frame disposition of said frame assembly means a center-line through said first frame means will intersect a center-line through at least a portion of said second frame means at a predetermined angle;

(b) side support means carried by said frame assembly for movement between a first or collapsed support disposition wherein said side support means are collapsed proximate to but support said frame assembly means and a second or erected disposition wherein said side support means extend from and further support said frame assembly means; and (c) operating means carried by and interconnecting said frame assembly means and said side support means and responsive to movement of said frame assembly means between said first frame disposition and second frame disposition to move said side support means between said first support and said second support dispositions thereof.

3. A cart for use by golfers and the like; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article;

(b) side support means carried by said frame assembly for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means and responsive to movement of said frame assembly means between said first frame disposition and second frame disposition to move said side support means between said first support and said second support dispositions thereof;

(d) said first frame means being formed as a hollow tube within which a slide means is movable with respect to said first frame means between a first slide disposition and a second slide disposition;

(e) said operating means including slide operating means connecting said second frame means to said slide means such that upon movement of said frame assembly means into said first frame disposition said slide means is moved into said first slide disposition and upon movement of said frame assembly means into said second frame disposition said slide means is moved into said second slide disposition; and (f) said operating means also including connection means connecting said slide means to said side support means such that upon movement of said slide means to said first slide disposition said side support means is moved into said first support disposition and upon movement of said slide means into said second slide disposition said slide support means is moved into said second support disposition.

4. A cart for use by golfers and the like; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article;

(b) side support means carried by said frame assembly for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means and responsive to movement of said frame assembly means between said first frame disposition and second frame disposition to move said side support means between said first support and said second support dispositions thereof;

(d) said first frame means being formed as a hollow tube within which a slide means, carried by a plurality of wheels, is movable with respect to said first frame means between a first slide disposition and a second slide disposition;

(e) said operating means including slide operating means connecting said second frame means to said slide means such that upon movement of said frame assembly means into said first frame disposition said slide means is moved into said first slide disposition and upon movement of said frame assembly means into said second frame disposition said slide means is moved into said second slide disposition;

(f) said operating means also including connection means connecting said slide means to said side support means such that upon movement of said slide means to said first slide disposition said side support means is moved into said first support disposition and upon movement of said slide means into said second slide disposition said slide support means is moved into said second support disposition;

(g) said hollow tube including an elongated slot aligned with said slide means in said first and said second slide dispositions thereof, said slide means including a slide part that extends through said elongated slot and pivotally connects to said slide operating means; and (h) a slot cover carried by said first frame means and that is extended over said elongated slot as said slide means moves into said first slide disposition.

5. An articulated support frame; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article;

(b) side support means carried by said frame assembly for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means and responsive to movement of said frame assembly means between said first frame disposition and second frame disposition to move said side support means between said first support and said second support dispositions thereof;

(d) said first frame means being formed as a hollow tube within which a slide means is movable with respect to said first frame means between a first slide disposition and a second slide disposition;

(e) said operating means including slide operating means connecting said second frame means to said slide means such that upon movement of said frame assembly means into said first frame disposition said slide means is moved into said first slide disposition and upon movement of said frame assembly means into said second frame dispostion said slide means is moved into said second slide dispostion; and (f) said operating means also including connection means connecting said slide means to said side support means such that upon movement of said slide means to said first slide disposition said side support means is moved into said first support disposition and upon movement of said slide means into said second slide disposition said slide support means is moved into said second support disposition.

6. An articulated support frame; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article;

(b) side support means carried by said frame assembly for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means and responsive to movement of said frame assembly means between said first frame disposition and second frame disposition to move said side support means between said first support and said second support dispositions thereof;

(d) said first frame means being formed as a hollow tube within which a slide means is movable with respect to said first frame means between a first slide disposition and a second slide disposition;

(e) said operating means including slide operating means connecting said second frame means to said slide means such that upon movement of said frame assembly means into said first frame disposition said slide means is moved into said first slide disposition and upon movement of said frame assembly means into said second frame disposition said slide means is moved into said second slide disposition; and (f) said operating means also including connection means connecting said slide means to said side support means such that upon movement of said slide means to said first slide disposition said side support means is moved into said first support disposition and upon movement of said slide means into said second slide disposition said slide support means is moved into said second support disposition;

(g) said hollow tube being formed with an elongated slot aligned with said slide means in said first and said second slide disposition thereof;

(h) and said slide means including a slide part that extends through said elongated slot and pivotally connects to said slide operating means;

(i) said first frame member carrying a slot cover that is extended over said elongated slot as said slide means moves into said first slide disposition.

7. An articulation support frame; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article;

(b) side support means carried by said frame assembly for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means and responsive to movement of said frame assembly means between said first frame disposition and second frame disposition to move said side support means between said first support and said second support dispositions thereof;

(d) said side support means including a first side support carried to one side of said frame assembly means and a second side support carried to a second side of said frame assembly means, each such side support including a support mount means and each such support mount means carrying a side support member comprising a rotatively mounted wheel;

(e) said operating means including slide means carried by said first frame means, and movable with respect to said first frame means between a first slide disposition and a second slide disposition and said second frame means carrying slide operating means connecting said second frame means to said slide means such that upon movement of said frame assembly means into said first frame disposition said slide means is moved into said first slide disposition and upon movement of said frame assembly means into said second frame disposition said slide means is moved into said second slide disposition;

(f) said operating means further including connection means connecting said slide means to said side support means such that upon movement of said slide means to said first slide disposition said side support means is moved into said first support disposition and upon movement of said slide means into said second slide disposition said side support means is moved into said second support disposition;

(g) said slide operating means and said slide means, as well as said slide operating means and said second frame means, and said slide means and each of said side supports being respectively pivotally connected together, with all of said pivotal connections including pivot means that are disposed so that all pivoting is about vertically disposed axes, except for the pivotal connection between said slide operating means and said second frame means;

(h) said slide operating means further including at least an operating strap pivotally connected proximate a first end thereof to said second frame means and proximate a second end thereof to said slide means;

(i) handle means pivotally carried by said second frame means for movement between a first or collapsed handle disposition and a second or erected handle disposition;

(j) said second frame means being formed with a groove with said handle means nesting in said groove when said handle means are disposed in said first handle disposition;

(k) handle latch means interconnecting said handle means and said second frame means and settable between a latched disposition wherein said handle means is prevented from movement between said first handle disposition and said second handle disposition and an unlatched disposition wherein said handle means are permitted movement between said first handle disposition and said second handle disposition;

(l) said latch means being canister like in configuration and including:
  (i) a pair of cup-like members carried by said second frame means in spaced relationship one member with respect to the other and said handle means carries at an end thereof a disc-like member sized and configured to be disposed in said space between said cup-like members;
  (ii) at least one of said cup-like members and said disc-like member each having holes formed therein about hole circles of equal diameter and which are concentric when said disc-like member is disposed between said cup-like members;
  (iii) a latch member carried by said disc-like member which has holes formed therein, said latch member including a plurality of projections arranged thereon in a projection circle concentric with and of the same size as said hole circles and such that said projections may extend through said holes in said cup-like member of said handle means; and
  (iv) latch operation means carried by said latch means for coaction with said latch member to move said latch member between a latching disposition wherein said projections extend into said holes in said disc-like member and a release disposition wherein said projections are prevented from entering said holes in said disc-like member.

8. A cart for use by golfers and the like; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article and wherein in said second frame disposition of said frame assembly means a center-line through said first frame means will intersect a center-line through at least a portion of said second frame means at a predetermined angle;

(b) side support means carried by said frame assembly means for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means responsive to movement of said frame assembly means between said first frame disposition and second frame disposition to move said side support means between said first support and said second support dispositions thereof;

(d) said side support means, including a first side support carried to one side of said frame assembly means and a second side support carried to a second side of said frame assembly means;

(e) each such side support carrying a wheel mount means and each such wheel mount means rotatively carrying a wheel;

(f) said first frame means carrying slide means movable with respect to said first frame means between a first slide disposition and a second slide disposition and said second frame means carrying slide operating means connecting said second frame means to said slide means such that upon movement of said frame assembly means into said first frame disposition said slide means is moved into said first slide disposition and upon movement of said frame assembly means into said second frame disposition said slide means is moved into said second slide disposition, and;

(g) connection means connecting said slide means to said side support means such that upon movement of said slide means to said first slide disposition said side support means is moved into said first support disposition and upon movement of said slide means into said second slide disposition said side support means is moved into said second support disposition.

9. An articulated support frame; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article and wherein in said second frame disposition of said frame assembly means a center-line through said first frame means will intersect a center-line through at least a portion of said second frame means at a predetermined angle;

(b) side support means carried by said frame assembly means for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means responsive to movement of said frame assembly means between said first frame disposition and second frame disposition to move said side support means between said first support and said second support dispositions thereof;

(d) said side support means, including a first side support carried to one side of said frame assembly means and a second side support carried to a second side of said frame assembly means;

(e) each such side support including a support mount means and each such support mount means carrying a side support member;

(f) said first frame means carrying slide means movable with respect to said first frame means between a first slide disposition and a second slide disposition and said second frame means carrying slide operating means connecting said second frame means to said slide means such that upon movement of said frame assembly means into said first frame disposition said slide means is moved into said first slide disposition and upon movement of said frame assembly means into said second frame disposition said slide means is moved into said second slide disposition, and;

(g) connection means connecting said slide means to said slide support means such that upon movement of said slide means to said first slide disposition said side support means is moved into said first support disposition and upon movement of said slide means into said second slide disposition said side support means is moved into said second support disposition.

10. An articulated support frame; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article and wherein in said second frame disposition of said frame assembly means a center-line through said first frame means will intersect a center-line through at least a portion of said second frame means at a predetermined angle;

(b) side support means carried by said frame assembly means for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means responsive to movement of said frame assembly means between said first frame disposition and second frame disposition to move said side support means between said first support and said second support dispositions thereof;

(d) said side support means, including a first side support carried to one side of said frame assembly means and a second side support carried to a second side of said frame assembly means;

(e) each such side support including a support mount means and each such support mount means carrying a side support member;

(f) connection means comprising a pair of operating straps each pivotally mounted proximate one of its ends to said second frame means at a position above said joint means and each pivotally mounted proximate its other end to one of said side supports.

11. An articulated support frame; comprising:

(a) frame assembly means including at least a first frame means and a second frame means and joint means connecting said first frame means and said second frame means for movement with respect to each other and of said frame assembly means between a first or collapsed frame disposition wherein said first frame means and said second frame means are disposed proximate each other and a second or erected disposition wherein said first frame means and said second frame means are arranged to receive and carry an article and wherein in said second frame disposition of said frame assembly means a center-line through said first frame means will intersect a center-line through at least a portion of said second frame means at a predetermined angle;

(b) side support means carried by said frame assembly means for movement between a first or collapsed support disposition wherein said side support means are collapsed proximate to but support said frame assembly means and a second or erected disposition wherein said side support means extend from and further support said frame assembly means;

(c) operating means carried by and interconnecting said frame assembly means and said side support means responsive to movement of said frame assembly means between said first frame disposition and second frame disposition to move said side support means between said first support and said second support dispositions thereof;

(d) said side support means, including a first side support carried to one side of said frame assembly means and a second side support carried to a second side of said frame assembly means;

(e) each such side support including a support mount means and each such support mount means carrying a side support member; and (f) connection means comprising a pair of operating straps each pivotally mounted proximate one of its ends to said first frame means at a position removed from said joint means and each pivotally mounted proximate its other end to one of said side supports.

12. An articulated support frame; comprising:

(a) a frame assembly including at least a first frame and a second frame and ajoint connecting said first frame and said second frame for movement with respect to each other and of said frame assembly between a first or collapsed frame disposition wherein said first frame and said second frame are disposed proximate each other and a second or erected disposition wherein said first frame and said second frame are arranged to coact to receive, position and carry an article and wherein in said second frame disposition of said frame assembly a center-line through said first frame intersects a center-line through at least a portion of said second frame at a predetermined angle;

(b) a side support carried by said frame assembly for movement between a first or collapsed support disposition wherein said side support is collapsed proximate to but supports said frame assembly and a second or erected disposition wherein said side support extends from and further supports said frame assembly; and (c) an operating mechanism carried by and interconnecting said frame assembly and said side support and responsive to movement of said frame assembly between said first frame disposition and second frame disposition to move said side support between said first support and said second support dispositions thereof.

13. The cart of claim 2, wherein handle means are carried by said second frame means for movement between a first or collapsed handle disposition and a second or erected handle disposition.

14. The cart of claim 13, wherein said second frame means is formed with a groove and said handle means nest in said groove when said handle means are disposed in said first handle disposition.

15. The cart of claim 14, wherein said handle means is carried by said second frame means for pivotal movement between said first handle disposition and said second handle disposition.

16. The cart of claim 15, including handle latch means interconnecting said handle means and said second frame means and settable between a latched disposition wherein said handle means is prevented from movement between said first handle disposition and said second handle disposition and an unlatched disposition wherein said handle means are permitted movement between said first handle disposition and said second handle disposition.

17. The cart of claim 1 further including:

(a) a pair of spaced latching holes formed in said disc-like member about a latching circle concentric with but of lesser diameter than said hole circle;

(b) a latching projection extending from said latch member for coaction with said latching holes said latching projection preventing movement of said latch member into said latching disposition thereof unless and until said latching projection is aligned with one of said latching holes.

18. The cart of claim 13, wherein said second frame means is formed with a hollow and said handle means is carried by said second frame means for movement into said hollow and out of said hollow.

19. The cart of claim 2, wherein said first frame means and said second frame means are each formed with first ends and second ends; said joint means being carried at and pivotally connecting said respective first ends of said first frame means and said second frame means.

20. The cart of claim 3, wherein said slide operating means includes at least one operating strap pivotally carried by said second frame means and said slide means.

21. The cart of claim 20, wherein said slide operating means includes at least a pair of spaced and aligned operating straps pivotally carried by said second frame means and said slide means.

22. The cart of claim 3, wherein said hollow tube is formed with an elongated slot aligned with said slide means in said first and said second slide dispositions thereof and said slide means includes a slide part that extends through said elongated slot and pivotally connects to said slide operating means.

23. The cart of claim 22, wherein said slide means comprises a slide member carried by a plurality of wheels.

24. The cart of claim 4, wherein said slot cover is disposed within said hollow of said tube.

25. The cart of claim 2, wherein said side support means rotatively mounts at least one wheel.

26. The cart of claim 2, wherein said side support means rotatively mounts a pair of wheels.

27. The cart of claim 2, wherein said side support means carries at least one wheel mount that, in turn, rotatively carries a wheel.

28. The cart of claim 2, wherein said side support means includes a first side support carried to one side of said frame assembly means and a second side support carried to a second side of said frame assembly means.

29. The cart of claim 28, wherein each such side support rotatively carries a wheel.

30. The cart of claim 29, wherein each such side support carries a wheel mount means and each such wheel mount means rotatively carries a wheel.

31. The cart of claim 8, wherein:

(a) said slide operating means and said slide means are pivotally connected together;

(b) said slide operating means and said second frame means are pivotally connected together; and (c) said slide means and each of said side supports are pivotally connected together.

32. The cart of claim 31, wherein all of said pivotal connections include pivot means that are disposed so that all pivoting is,about vertically disposed axes, except for the pivotal connection between said slide operating means and said second frame means.

33. The cart of claim 32, wherein said slide operating means includes at least an operating strap pivotally connected proximate a first end thereof to said second frame means and proximate a second end thereof to said slide means.

34. The cart of claim 33 wherein each of said side supports includes:

(a) at least a first support bar pivotally connected proximate one of its ends to said joint means and pivotally connected proximate its other end to a wheel mount means; and (b) at least a first connection strap pivotally connected proximate one of its ends to said slide means and pivotally connected proximate its other end to said first support bar.

35. The cart of claim 2, wherein said article to be carried is a golf bag.

36. The cart of claim 2, including forward rest means carried by said first frame means proximate an end thereof opposite said joint means.

37. The cart of claim 36, wherein said forward rest means includes a first article support and said second frame means carries a second article support at a position thereon proximate an end thereof opposite said joint means; said first article support and said second article support supporting therebetween an article at a predetermined angle.

38. The cart of claim 37, wherein the article is a golf bag.

39. The support frame of claim 12, wherein said first frame means and said second frame means are each formed with first ends and second ends; said joint being carried at and pivotally connecting said respective first ends of said first frame and said second frame means.

40. The support frame of claim 12, wherein said predetermined angle is substantially ninety degrees.

41. The support frame of claim 5, wherein said slide operating means includes at least one operating strap pivotally carried by said second frame means and said slide means.

42. The support frame of claim 41, wherein said slide operating means includes at least a pair of spaced and aligned operating straps pivotally carried by said second frame means and said slide means.

43. The support frame of claim 5, wherein said hollow tube is formed with an elongated slot aligned with said slide means in said first and said second slide dispositions thereof and said slide means includes a slide part that extends through said elongated slot and pivotally connects to said slide operating means.

44. The support frame of claim 43, wherein said slide means comprises a slide member carried by a plurality of wheels.

45. The support frame of claim 6, wherein said slot cover is disposed within said hollow of said tube.

46. The support frame of claim 12, wherein said side support means includes a first side support carried to one side of said frame assembly and a second side support carried to a second side of said frame assembly.

47. The support frame of claim 46, wherein each such side support includes a support mount and each such support mount carries a side support member.

48. The support frame of claim 9, wherein:
(a) said slide operating means and said slide means are pivotally connected together;
(b) said slide operating means and said second frame means are pivotally connected together; and
(c) said slide means and each of said side supports are pivotally connected together.

49. The support frame of claim 48, wherein all of said pivotal connections include pivot means that are disposed so that all pivoting is about vertically disposed axes, except for the pivotal connection between said slide operating means and said second frame means.

50. The support frame of claim 49, wherein said slide operating means includes at least an operating strap pivotally connected proximate a first end thereof to said second frame means and proximate a second end thereof to said slide means.

51. The support frame of claim 50 wherein each of said side supports includes:
(a) at least a first support bar pivotally connected proximate one of its ends to said joint means and pivotally connected proximate its other end to a wheel mount means; and
(b) at least a first connection strap pivotally connected proximate one of its ends to said slide means and pivotally connected proximate its other end to said first support bar.

52. The support frame of claim 50 wherein each of said side supports includes:
(a) at least a first support bar pivotally connected proximate one of its ends to said joint means and pivotally connected proximate its other end to a support mount means; and
(b) at least a first connection strap pivotally connected proximate one of its ends to said slide means and pivotally connected proximate its other end to a support mount means.

53. The support frame of claim 50 wherein each of said side supports includes:
(a) at least a first support bar pivotally connected proximate one of its ends to said slide means and pivotally connected proximate its other end to a support mount means; and
(b) at least a first connection strap pivotally connected proximate one of its ends to said joint means and pivotally connected proximate its other end to said first support bar.

54. The support frame of claim 50 wherein each of said side supports includes:
(a) a first support bar and a second support bar horizontally aligned with said first support bar, each of said support bars being pivotally connected proximate one of its ends to said joint means and pivotally connected proximate its other end to a support mount means; and
(b) at least a first connection strap pivotally connected proximate one of its ends to said joint means and pivotally connected proximate its other end to said second support bar.

55. The support frame of claim 50 wherein each of said side supports includes:
(a) a first support bar and a second support bar horizontally aligned with said first support bar, each of said support bars being pivotally connected proximate one of its ends to said joint means and pivotally connected proximate its other end to a support mount means; and
(b) at least a first connection strap pivotally connected proximate one of its ends to said joint means and pivotally connected proximate its other end to said support mount means.

56. The support frame of claim 50 wherein each of said side supports includes:
(a) a first support bar and a second support bar horizontally aligned with said first support bar, each of said support bars being pivotally connected proximate one of its ends to said slide means and pivotally connected proximate its other end to a support mount means; and
(b) at least a first connection strap pivotally connected proximate one of its ends to said joint means and pivotally connected proximate its other end to said support mount means.

57. The support frame of claim 50 wherein each of said side supports includes:
(a) a first support bar and a second support bar horizontally aligned with said first support bar, each of said support bars being pivotally connected proximate one of its ends to said slide and pivotally connected proximate its other end to a support mount means; and
(b) at least a first connection strap pivotally connected proximate one of its ends to said joint means and pivotally connected proximate its other end to said first support bar.

58. The support frame of claim 50 wherein each of said side supports includes:
  (a) a first support bar and a second support bar horizontally aligned with said first support bar, each of said support bars being pivotally connected proximate one of its ends to said slide means and pivotally connected proximate its other end to a support mount means; and
  (b) a first connection strap and a second connection strap vertically aligned with said first connection strap, each of said connection straps being pivotally connected proximate one of its ends to said joint means and pivotally connected proximate its other end to said support mount means.

59. The support frame of claim 50 wherein each of said side supports includes:
  (a) a first support bar and a second support bar horizontally aligned with said first support bar, each of said support bars being pivotally connected proximate one of its ends to said joint means and pivotally connected proximate its other end to a support mount means; and
  (b) a first connection strap and a second connection strap vertically aligned with said first connection strap, each of said connection straps being pivotally connected proximate one of its ends to said joint means and pivotally connected proximate its other end to said support mount means.

60. The support frame of claim 50 wherein each of said side supports includes:
  (a) at least a first support bar connected proximate one of its ends to said means and pivotally connected proximate its other end to a support mount means; and
  (b) a first connection strap and a second connection strap, said first and second connection straps being vertically aligned, each such connection strap being pivotally connected proximate one of its ends to said joint means and pivotally connected proximate its other end to a support mount means.

61. The support frame of claim 50, wherein each of said side supports includes:
  (a) at least a first support bar pivotally connected proximate one of its ends to said joint means and pivotally connected proximate its other end to a support mount means; and
  (b) a first connection strap and a second connection strap, said first and second connection straps being vertically aligned, each such connection strap being pivotally connected proximate one of its ends to said slide means and pivotally connected proximate its other end to said support mount means.

62. The support frame of claim 49, wherein: said slide operating means includes a pair of operating straps one end of each of which is pivotally connected to said second frame means with the other end of each of said operating straps being pivotally connected to one of said side supports.

63. The support frame of claim 62 wherein each of said side supports includes:
  (a) at least a first support bar pivotally connected proximate one of its ends to said joint means and pivotally connected proximate its other end to a support mount means; and
  (b) at least a first connection strap pivotally connected proximate one of its ends to said slide mean and pivotally connected proximate its other end to said first support bar;
  (c) said other ends of said operating straps being pivotally connected to a respective one of said connection straps.

64. The support frame of claim 62 wherein each of said side supports includes:
  (a) at least a first support bar pivotally connected proximate one of its ends to said joint means and pivotally connected proximate its other end to a support mount means;
  (b) at least a first connection strap pivotally connected proximate one of its ends to said slide mean and pivotally connected proximate its other end to a support mount means; and
  (c) each of said other ends of said operating straps being pivotally connected to a respective one of said connection straps.

65. The support frame of claim 62 wherein each of said side supports includes:
  (a) at least a first support bar pivotally connected proximate one of its ends to said slide means and pivotally connected proximate its other end to a support mount means;
  (b) at least a first connection strap pivotally connected proximate one of its ends to said joint means and pivotally connected proximate its other end to said first support bar;
  (c) each of said other ends of said operating straps being pivotally connected to a respective one of said first support bars.

66. The support frame of claim 62 wherein each of said side supports includes:
  (a) a first support bar and a second support bar horizontally aligned with said first support bar, each of said support bars being pivotally connected proximate one of its ends to said joint means and pivotally connected proximate its other end to a support means; and
  (b) at least a first connection strap pivotally connected proximate one of its ends to said joint means and pivotally connected proximate its other end to said second support bar;
  (c) each of said other ends of said operating straps being pivotally connected to a respective one of said connection straps.

67. The support frame of claim 62 wherein each of said side supports includes:
  (a) a first support bar and a second support bar horizontally aligned with said first support bar, each of said support bars being pivotally connected proximate one of its ends to said joint means and pivotally connected proximate its other end to a support mount means; and
  (b) at least a first connection strap pivotally connected proximate one of its ends to said joint means and pivotally connected proximate its other end to said support mount means;
  (c) each of said other ends of said operating straps being pivotally connected to a respective one of said connection straps.

68. The support frame of claim 62 wherein each of said side supports includes:
  (a) a first support bar and a second support bar horizontally aligned with said first support bar, each of said support bars being pivotally connected proximate one of its ends to said slide means and pivotally connected proximate its other end to a support mount means; and
  (b) at least a first connection strap pivotally connected proximate one of its ends to said joint means and pivotally connected proximate its other end to said support mount means;

(c) each of said other ends of said operating straps being pivotally connected to a respective one of said first support bars.

69. The support frame of claim 62 wherein each of said side supports includes:
   (a) a first support bar and a second support bar horizontally aligned with said first support bar, each of said support bars being pivotally connected proximate one of its ends to said slide and pivotally connected proximate its other end to a support mount means; and
   (b) at least a first connection strap pivotally connected proximate one of its ends to said joint means and pivotally connected proximate its other end to said first support bar;
   (c) each of said other ends of said operating straps being pivotally connected to a respective one of said first support bars.

70. The support frame of claim 62 wherein each of said side supports includes:
   (a) a first support bar and a second support bar horizontally aligned with said first support bar, each of said support bars being pivotally connected proximate one of its ends to said slide means and pivotally connected proximate its other end to a support mount means; and
   (b) a first connection strap and a second connection strap vertically aligned with said first connection strap, each of said connection straps being strap pivotally connected proximate one of its ends to said joint means and pivotally connected proximate its other end to said support mount means;
   (c) each of said other ends of said operating straps being pivotally connected to a respective one of said first support bars.

71. The support frame of claim 62 wherein each of said side supports includes:
   (a) a first support bar and a second support bar horizontally aligned with said first support bar, each of said support bars being pivotally connected proximate one of its ends to said joint means and pivotally connected proximate its other end to a support mount means; and
   (b) a first connection strap and a second connection strap vertically aligned with said first connection strap, each of said connection straps being strap pivotally connected proximate one of its ends to said joint means and pivotally connected proximate its other end to said support mount means;
   (c) each of said other ends of said operating straps being pivotally connected to a first one of said connection straps.

72. The support frame of claim 62 wherein each of said side supports includes:
   (a) at least a first support bar connected proximate one of its ends to said slide means and pivotally connected proximate its other end to a support mount means; and
   (b) a first connection strap and a second connection strap, said first and second connection straps being vertically aligned, each such connection strap being pivotally connected proximate one of its ends to said joint means and pivotally connected proximate its other end to a support mount means;
   (c) each of said other ends of said operating means being pivotally connected to said first support bar.

73. The support frame of claim 62 wherein each of said side supports includes:
   (a) at least a first support bar pivotally connected proximate one of its ends to said joint means and pivotally connected proximate its other end to a support mount means; and
   (b) a first connection strap and a second connection strap, said first and second connection straps being vertically aligned, each such connection strap being pivotally connected proximate one of its ends to said slide means and pivotally connected proximate its other end to said support mount means;
   (c) each of said other ends of said operating means being pivotally connected to a first one of said connection straps.

74. The support frame of claim 73, wherein each of said side supports includes a pair of horizontally aligned support bars pivotally connected at respective first ends thereof to said first frame means and at respective second ends thereof to a respective one of said support mount means; each one of said connection straps being pivotally mounted to a respective one of said support bars of one of said side supports.

75. The support frame of claim 73, wherein each of said side supports includes a pair of horizontally aligned support bars pivotally connected at respective first ends thereof to said first frame means and at respective second ends thereof to a respective one of said support mount means; each one of said connection straps being pivotally mounted to a respective one of said support mount means of one of said side supports.

76. The support frame of claim 11, wherein each of said side supports includes a pair of horizontally aligned support bars pivotally connected at respective first ends thereof to said first frame means and at respective second ends thereof to a respective one of said support mount means; each one of said connection straps being pivotally mounted to a respective one of said support bars of one of said side supports.

77. The support frame of claim 11, wherein each of said side supports includes a support bar pivotally connected at a first end thereof to said first frame means and at a second end thereof to a respective one of said support mount means; each one of said connection straps being pivotally mounted to one of said support bars.

78. The support frame of claim 12, wherein said article to be carried is a golf bag.

79. The support frame of claim 12, including a forward rest means carried by said first frame proximate an end thereof opposite said joint.

80. The support frame of claim 79, wherein said forward rest includes a first article support and said second frame carries a second article support at a position thereon proximate an end thereof opposite said joint; said first article support and said second article support supporting therebetween an article at a predetermined angle.

81. The support frame of claim 80, wherein the article is a golf bag.

82. The support frame of claim 50, wherein each side support member is a rotatively mounted wheel.

83. The support frame of claim 62, wherein each side support member is a rotatively mounted wheel.

84. The support frame of claim 82, wherein each wheel mount includes an electrically powered wheel drive means and said frame assembly means carries battery means connected to said wheel drive means to provide electric power to said wheel mount means; and control means connected to said battery means and wheel drive means to control said battery power to said wheel drive means.

85. The support frame of claim 84, wherein said battery means is carried by said first frame means and said first second frame means is configured to be positioned over said battery means in its collapsed disposition.

86. The support frame of claim 85, wherein said battery means is carried by said slide means and moves therewith.

87. The support frame of claim 86, including container means carried by said battery means.

88. The support frame of claim 87, wherein said container means includes a pair of containers disposed one to each side of said battery means.

89. The support frame of claim 88, wherein said first frame means carries a forward rest for a golf bag proximate an end thereof spaced from said joint means.

90. The support frame of claim 89 wherein said forward rest includes a seat means.

91. The support frame of claim 90, wherein said seat means is carried by said first frame mans for disposition in seat raised and a seat collapsed positions.

92. The support frame of claim 82, wherein handle means are carried by said second frame means for movement between a first or collapsed handle disposition and a second or erected handle disposition.

93. The support frame of claim 92, wherein said second frame means is formed with a groove and said handle means nest in said groove when said handle means are disposed in said first handle disposition.

94. The support frame of claim 93, wherein said handle means is carried by said second frame means for pivotal movement between said first handle disposition and said second handle disposition.

95. The support frame of claim 94, including handle latch means interconnecting said handle means and said second frame means and settable between a latched disposition wherein said handle means is prevented from movement between said first handle disposition and said second handle disposition and an unlatched disposition wherein said handle means are permitted movement between said first handle disposition and said second handle disposition.

96. The cart of claim 7, further including:
(a) a pair of spaced latching holes formed in said disc-like member about a latching circle concentric with but of lesser diameter than said hole circle;
(b) a latching projection extending from said latch member for coaction with said latching holes said latching projection preventing movement of said latch member into said latching disposition thereof unless and until said latching projection is aligned with one of said latching holes.

97. The cart of claim 33, wherein each of said side supports includes:
(a) a first support bar and a second support bar horizontally aligned with said first support bar, each of said support bars being pivotally connected proximate one of its ends to said joint means and pivotally connected proximate its other end to a wheel mount means; and
(b) at least a first connection strap pivotally connected proximate one of its ends to said joint means and pivotally connected proximate its other end to said second support bar.

98. The cart of claim 2, wherein said predetermined angle is substantially ninety degrees.

* * * * *